(12) United States Patent
Simanek et al.

(10) Patent No.: US 9,665,991 B2
(45) Date of Patent: May 30, 2017

(54) TOLLING USING MOBILE DEVICE

(75) Inventors: Michael E. Simanek, Palatine, IL (US); Michael J. Wilson, Toronto (CA); Martin W. Glowik, Des Plaines, IL (US)

(73) Assignee: Accenture Global Services Limited, Dublin (IE)

( * ) Notice: Subject to any disclaimer, the term of this patent is extended or adjusted under 35 U.S.C. 154(b) by 243 days.

(21) Appl. No.: 13/174,250

(22) Filed: Jun. 30, 2011

(65) Prior Publication Data
US 2013/0006724 A1 Jan. 3, 2013

(51) Int. Cl.
G07B 15/00 (2011.01)
G07B 15/06 (2011.01)
G06Q 30/02 (2012.01)

(52) U.S. Cl.
CPC ....... G07B 15/063 (2013.01); G06Q 30/0207 (2013.01); G06Q 30/0251 (2013.01)

(58) Field of Classification Search
CPC ... G07B 15/063; G07C 5/008; G06Q 30/0284
USPC .................................................. 705/13, 417
See application file for complete search history.

(56) References Cited

U.S. PATENT DOCUMENTS

| | | | |
|---|---|---|---|
| 4,445,118 A | 4/1984 | Taylor et al. | |
| 4,651,157 A | 3/1987 | Gray et al. | |
| 5,359,528 A | 10/1994 | Haendel et al. | |
| 5,396,540 A | 3/1995 | Gooch | |
| 5,864,831 A | * 1/1999 | Schuessler | 705/417 |
| 5,970,481 A | * 10/1999 | Westerlage et al. | 705/417 |
| 6,411,889 B1 | * 6/2002 | Mizunuma et al. | 701/117 |

(Continued)

FOREIGN PATENT DOCUMENTS

| | | |
|---|---|---|
| DE | 4334160 A1 | 12/1994 |
| DE | 4310099 C2 | 9/1997 |

(Continued)

OTHER PUBLICATIONS

Accenture, "Fare Management for High Performance-Road Charging" 2009, Downloaded from the internet at: http://www.accenture.com/SiteCollectionDocuments/PDF/Accenture_TTS_Fare_Management Road_Charging.pdf on Nov. 22, 2011, 2 pages.

(Continued)

Primary Examiner — Brian Epstein
(74) Attorney, Agent, or Firm — Fish & Richardson P.C.

(57) ABSTRACT

In one aspect, a tolling system is operable to perform operations, which may include: receiving, over a network and from a mobile device application operating on a mobile processing device, an identifier and road usage data collected by the mobile device application; identifying a profile based on the identifier; accessing a toll pricing model applicable to an entity associated with the identified profile; and determining a tolling charge incurred by the entity based on the road usage data collected by the mobile device application, the identified profile, and the accessed toll pricing model. In another aspect, a mobile device application is operable to perform operations that may include: collecting road usage data; communicating, over a network to a tolling system, the collected road usage data and an identifier; and receiving, from the tolling system, tolling charge data computed based on the communicated road usage data.

18 Claims, 16 Drawing Sheets

(56) References Cited

U.S. PATENT DOCUMENTS

| | | | |
|---|---|---|---|
| 7,254,382 B2 | 8/2007 | Hasan et al. | |
| 7,431,202 B1* | 10/2008 | Meador et al. | 235/379 |
| 8,587,454 B1* | 11/2013 | Dearworth | 340/928 |
| 9,196,099 B2* | 11/2015 | Grill | G07C 5/085 |
| 9,406,033 B2* | 8/2016 | Dempski | G06Q 10/047 |
| 2002/0032506 A1* | 3/2002 | Tokitsu et al. | 701/29 |
| 2002/0091568 A1* | 7/2002 | Kraft et al. | 705/14 |
| 2003/0115095 A1* | 6/2003 | Yamauchi | 705/13 |
| 2004/0119609 A1* | 6/2004 | Solomon | 340/928 |
| 2005/0278214 A1* | 12/2005 | Takida | 705/13 |
| 2006/0015394 A1* | 1/2006 | Sorensen | 705/13 |
| 2006/0278705 A1 | 12/2006 | Hedley et al. | |
| 2008/0040210 A1 | 2/2008 | Hedley | |
| 2008/0065568 A1* | 3/2008 | Dawson et al. | 705/400 |
| 2008/0208890 A1 | 8/2008 | Milam | |
| 2008/0316042 A1* | 12/2008 | Scales | G01S 19/21 340/686.1 |
| 2009/0024458 A1* | 1/2009 | Palmer | 705/13 |
| 2009/0146845 A1* | 6/2009 | Hedley | G06Q 30/0283 340/936 |
| 2009/0295599 A1* | 12/2009 | Coffee et al. | 340/928 |
| 2009/0299942 A1 | 12/2009 | Duan et al. | |
| 2010/0076878 A1* | 3/2010 | Burr et al. | 705/34 |
| 2010/0085213 A1 | 4/2010 | Turnock et al. | |
| 2010/0106567 A1* | 4/2010 | McNew et al. | 705/13 |
| 2010/0153125 A1* | 6/2010 | Hamilton et al. | 705/1.1 |
| 2010/0153193 A1 | 6/2010 | Ashby et al. | |
| 2010/0156670 A1 | 6/2010 | Hamilton et al. | |
| 2010/0161392 A1* | 6/2010 | Ashby et al. | 705/13 |
| 2010/0228608 A1 | 9/2010 | Hedley et al. | |
| 2010/0287038 A1* | 11/2010 | Copejans | G07B 15/063 705/13 |
| 2011/0010228 A1 | 1/2011 | Goto et al. | |
| 2013/0006725 A1 | 1/2013 | Simanek et al. | |

FOREIGN PATENT DOCUMENTS

| | | |
|---|---|---|
| WO | WO9636018 A1 | 11/1996 |
| WO | WO2009090515 A3 | 12/2009 |

OTHER PUBLICATIONS

Accenture, "Maximizing the Potential of Road-User Charging", 2008, downloaded from the internet at: http://www.accenture.com/SiteCollectionDocuments/PDF/RoadUserChargingFinal.pdf on Nov. 22, 2011, 8 pages.

USPTO Non-Final Office Action in U.S. Appl. No. 13/174,360, mailed Aug. 28, 2013, 21 pages.

Merritt, Dennis "Bulding Custom Rule Engines" (attp://web.archive.org/web/20100507023941/http://www.amzi.com.articles/rule_engines.htm> captured on Mary 7, 2010). PC A1 magazine, vol. 10, No. 2 Mar./Apr. 1996.

USPTO Non-Final Office Action in U.S. Appl. No. 13/174,360, dated Apr. 19, 2016, 32 pages.

USPTO Final Office Action in U.S. Appl. No. 13/174,360, dated Sep. 22, 2016, 35 pages.

* cited by examiner

TOLLING USING MOBILE DEVICE

FIELD

This disclosure relates to tolling technology, and more specifically to tolling using a mobile device.

BACKGROUND

In many states and municipalities, current funding is inadequate to keep pace with a growing need for improvement and maintenance of transportation facilities, such as roads, bridges, and tunnels. For example, revenue generated through federal sales taxes on gas for such purposes is steadily decreasing as citizens are using less fuel per mile of travel due to recent increases in fuel efficiency for many vehicles. Implementation of road/highway tolling has relieved at least some of this developing financial burden. Thus, systems and methods that provide more comprehensive and feasible tolling solutions may be desired.

SUMMARY

In one aspect, a tolling system is operable to perform operations, which may include: receiving, over a network and from a mobile device application operating on a mobile processing device, an identifier and road usage data collected by the mobile device application; identifying a profile based on the identifier; accessing a toll pricing model applicable to an entity associated with the identified profile; and determining a tolling charge incurred by the entity based on the road usage data collected by the mobile device application, the identified profile, and the accessed toll pricing model. In another aspect, a tolling method may include one or more of the operations recited above. In yet another aspect, a computer-readable storage medium may be operable to cause a processor to perform one or more of the operations described above.

In one or more of the aspects described above, receiving road usage data collected by the mobile device application may include receiving global positioning system data collected by the mobile device application using global positioning system hardware of the mobile processing device. In some example implementations, the global positioning system data may describe roads travelled and distance covered while the mobile device application was operating and collecting the global positioning system data.

In one or more of the aspects described above, accessing the toll pricing model applicable to the entity associated with the identified profile may include accessing a toll pricing model that sets a toll charge based on roads travelled and distance covered. Further, in some example implementations, determining the tolling charge incurred by the entity based on the road usage data collected by the mobile device application, the identified profile, and the accessed toll pricing model may include determining a tolling charge incurred by the entity by applying the global positioning system data to the toll pricing model that sets a toll charge based on roads travelled and distance covered.

In one or more of the aspects described above, the operations may further include: causing the mobile device application to communicate with a vehicle computing device located in a vehicle used by the entity and to receive distance data collected by the vehicle computing device that is descriptive of distance travelled by the vehicle; accessing distance data collected by the mobile device application that is descriptive of distance covered while the mobile device application was operating; comparing the distance data collected by the vehicle computing device with the distance data collected by the mobile device application; based on the comparison, determining whether the entity has been operating the mobile device application during operation of the vehicle in accordance with toll policy; and based on a determination that the entity has not been operating the mobile device application during operation of the vehicle in accordance with the toll policy, applying an enforcement fine to the entity.

In one or more of the aspects described above, the operations may further include: detecting, using a tolling data source external to the mobile device application, an event indicative of road usage engaged in by the entity; determining whether the mobile device application was operating at a time of the event indicative of road usage engaged in by the entity; and based on a determination that the mobile device application was not operating at a time of the event indicative of road usage engaged in by the entity, applying an enforcement fine to the entity.

In one or more of the aspects described above, the operations may further include transmitting, over the network and to the mobile device application, the determined toll charge incurred by the entity, thereby allowing the determined toll charge to be viewed using the mobile processing device.

In one or more of the aspects described above, the operations may further include: comparing toll charges incurred by the entity over a period of time to a usage alert threshold; based on the comparison, determining whether the toll charges incurred by the entity over the period of time meets the usage alert threshold; and based on a determination that the toll charges incurred by the entity over the period of time meets the usage alert threshold, transmitting, over the network and to the mobile device application, a usage alert that indicates toll charges incurred by the entity over the period of time that meets the usage alert threshold and that summarizes toll charges incurred by the entity over the period of time.

In one or more of the aspects described above, the operations may further include: accessing data defining, for a particular time period, variables that impact tolling charges determined by the toll pricing model; determining an expected tolling rate that will be incurred by the entity for the particular time period based on the variables; and transmitting, over the network and to the mobile device application, the expected tolling rate that will be incurred by the entity for the particular time period, thereby allowing the expected tolling rate to be viewed using the mobile processing device prior to operating a vehicle during the particular time period.

In one or more of the aspects described above, the operations may further include: determining an advertisement targeted to the entity based on the road usage data collected by the mobile device application and the identified profile; and transmitting, over the network and to the mobile device application, the advertisement targeted to the entity.

In one or more of the aspects described above, the operations may further include: transmitting, over the network and to the mobile device application, the determined toll charge incurred by the entity; and engaging, over the network and with the mobile device application, in a payment transaction that allows payment of the determined toll charge incurred by the entity through the mobile device application.

In one aspect, a mobile device application is operable to perform operations that may include: collecting road usage data; communicating, over a network to a tolling system, the collected road usage data and an identifier; and receiving, from the tolling system, tolling charge data computed based on the communicated road usage data collected by the mobile device application.

In one or more of the aspects described above, collecting road usage data may include receiving and collecting global positioning system data using global positioning hardware incorporated in the mobile processing device, the global positioning system data describing roads travelled and distance covered. Further, in some example implementations, receiving tolling charge data may include receiving tolling charge data determined by applying the global positioning system data to a toll pricing model that sets a toll charge based on roads travelled and distance covered.

In one or more of the aspects described above, collecting road usage data may include communicating with a vehicle computing device located in a vehicle associated with an entity and receiving distance data collected by the vehicle computing device that is descriptive of distance travelled by the vehicle.

In one or more of the aspects described above, receiving tolling charge data may include receiving tolling charge data that includes an enforcement fine assessed by the tolling system based on a determination that the mobile device application was not operating at a time of an event indicative of road usage detected by the tolling system.

In one or more of the aspects described above, receiving tolling charge data may include receiving a determined toll charge incurred by the entity and displaying the determined toll charge, via the mobile processing device, to be viewed by a user of the mobile device application.

In one or more of the aspects described above, the operations may further include: receiving, over the network and from the tolling system, a usage alert that indicates toll charges incurred by an entity over a period of time meets a usage alert threshold, and that summarizes toll charges incurred by the entity over the period of time; and displaying the usage alert, via the mobile processing device, to be viewed by a user of the mobile device application.

In one or more of the aspects described above, the operations may further include receiving, over the network and from the tolling system, an expected tolling rate that will be incurred by an entity for a particular time period and displaying the expected tolling rate, via the mobile processing device, to be viewed by a user of the mobile device application.

In one or more of the aspects described above, the operations may further include receiving, over the network and from the tolling system, an advertisement targeted to an entity and displaying the advertisement, via the mobile processing device, to be viewed by a user of the mobile device application. In some example implementations, the advertisement may be determined based on the collected road usage data and a profile distinguished by the identifier.

In one or more of the aspects described above, the operations may further include engaging, over the network and with the tolling system, in a payment transaction that allows payment of a determined toll charge incurred by an entity. In some example, implementations, the received tolling charge data comprises the determined toll charge incurred by the entity.

The details of one or more example implementations are set forth in the accompanying drawings and the description, below. Other potential features of the disclosure will be apparent from the description and drawings, and from the claims.

BRIEF DESCRIPTION OF THE DRAWINGS

Like reference numbers represent corresponding parts throughout.

DETAILED DESCRIPTION

Figure 1:
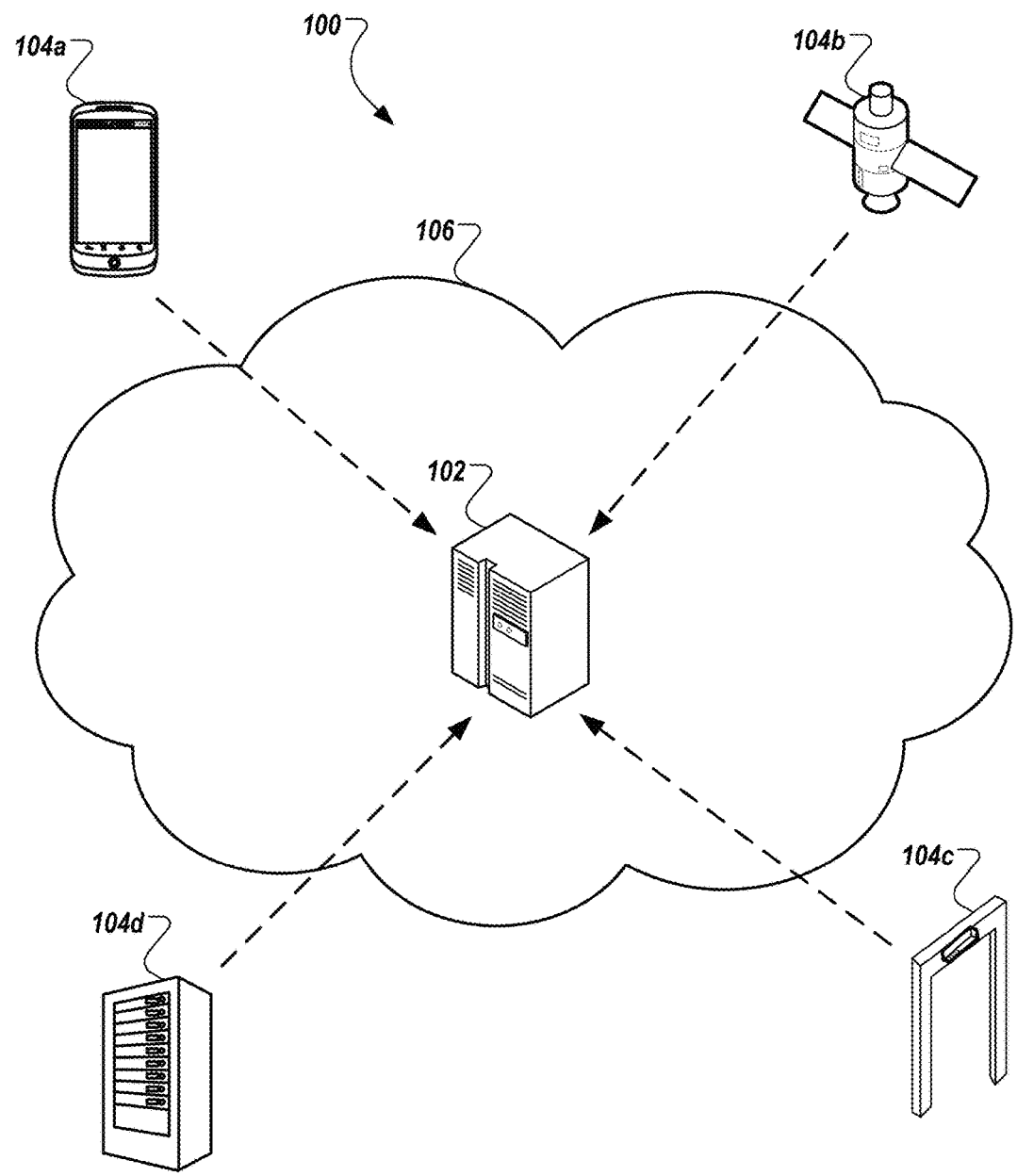
FIG. 1 is a schematic diagram of an exemplary tolling integration system.

FIG. 1 illustrates an exemplary tolling integration system 100. Tolling integration system 100 may include a tolling system 102 communicatively coupled to data sources 104a, 104b, 104c, and 104d (collectively 104) through network 106. Tolling system 102 may include a computer system (e.g., a mainframe computer system) capable of receiving, storing, and processing large amounts of tolling data. Tolling data may include data describing characteristics of road usage by an entity, such as a vehicle owner/driver or a vehicle fleet owner. For example, road usage data may include information describing how the entity is using tolled roads (e.g., vehicle occupancy data, vehicle mileage data, trip origin and destination data, toll facility interaction data, etc.), when the entity is using tolled roads (e.g., special event data, weather data, traffic congestion data, date and time, etc.), and where the entity is using tolled roads (e.g., vehicle location data). A data set describing such characteristics (e.g., a road usage data set) may be a subset of a tolling data set.

Tolling data also may include any other information that may be utilized in calculating a tolling charge. For example, data describing revenue associated with tolled roads (e.g., revenue generated through tolling, tolling revenue targets, etc.) may be considered tolling data and may be integrated with road usage data.

Data sources 104 may transmit or otherwise communicate tolling data to tolling system 102. For example, data source 104a represents one or more mobile processing devices that may be used to communicate tolling data to tolling system 102 (described in greater detail below). The mobile processing devices may be any suitable type of mobile computing device (e.g., mobile phone, smart phone, PDA, tablet computer, or other portable device) that includes one or more processors and computer readable media. Among other components, for example, the mobile processing devices may include one or more processors, computer readable media that store software applications, input devices (e.g., keyboards, touch screens, microphones, and the like), output devices (e.g., display screens, speakers, and the like), and communications interfaces.

Data source 104b represents one or more satellite and/or airborne devices for collecting and communicating tolling data to tolling system 102. Such devices may include, for example, weather blimps or satellites, manned or unmanned traffic surveillance aircrafts, etc. Data source 104c represents one or more roadside devices. Such devices may include still or live video cameras, sensors (e.g., RFID sensors, thermal sensors, inductive loops, magnetic sensors, acoustic sensors, microwave sensors, etc.), scanners, or the like. Data source 104d represents one or more external computing systems or databases (e.g., vehicle registration databases, motor vehicle statistics databases, law enforcement databases, etc.).

Although a tolling integration system may include one or more of the specific types of data sources shown and described, any suitable data source e.g., any device operable to collect and communicate tolling data to a tolling system) may be used, for any system or process described herein.

Tolling system 102 and data sources 104 may communicate with one another via network 106. Network 106 may include, for example, one or more of the Internet, Wide Area Networks (WANs), Local Area Networks (LANSs), analog or digital wired and wireless telephone networks (e.g., a public switched telephone network (PSTN)), Integrated Services Digital Network (ISDN), a cellular network (e.g., wireless local area networks (WLAN), WiFi networks, Third Generation (3G) or Fourth Generation (4G) mobile telecommunication networks), a Digital Subscriber Line (DSL), radio, television, cable, satellite, or any other delivery or tunneling mechanism suitable for carrying and delivering data. The network 106 may include multiple networks or subnetworks, each of which may include, for example, a wired or wireless pathway. The network 106 may include a circuit-switched network, a packet-switched data network, or any other network able to carry electronic communications (e.g., data or voice communications). For example, the network 106 may include networks based on the Internet protocol (IP), asynchronous transfer mode (ATM), or other comparable technologies.

Tolling integration system 100 may allow road providers (e.g., local or state governments) to conduct comprehensive and robust tracking of road usage by vehicle owning entities, and to determine and collect appropriate toll charges from such entities based on their road usage and other factors. For example, by leveraging various types of data sources 104 and integrating tolling data received from such data sources at a common tolling system 102, road providers can implement suitable tolling rules for raising sufficient revenue based on various aspects of entity road usage.

Tolling rules may be determined and implemented according to any received tolling data, for example: variable charges/credits may be applied based on vehicle type (e.g., Passenger Sedan, Sports car, SUV, Hybrid Sedan, Hybrid SUV, Diesel Semi, Bus, etc.); variable charges can be assessed based on time (rush hour) and location (metropolitan/downtown); weather score variables may be used (e.g., added/reduced cost based on National Weather service air quality score per zone/region); additional fees or increased tolling rates may be applied based on proximity to a major event (e.g., stadium events, parades, etc.); charges or debits may be applied based on entity provided data sources or identification items (for example, entities providing identification tags such as RFID devices, license plates, and/or data sources, such as mobile device applications may receive credits or be charged reduced tolling rates); and/or additional fees or increased tolling rates may be applied to entities owning vehicles traveling near bus, train, or subway stations to encourage use of public transportation. In some examples, these and other similar tolling rules can be combined or integrated to form a toll pricing model (see FIG. 5, for example).

In some example implementations, data sources 104 can be used in combination to implement tolling rules. For instance, tolling rules based on vehicle miles traveled can be implemented using various types of data sources 104. More specifically, in one example, a tolling rate (expressed in units of $/mile) can be provided as a function of weather data and/or traffic congestion data, and the distance traveled can be directly determined based on mobile device transmissions and/or roadside gantry readings.

Figure 2:
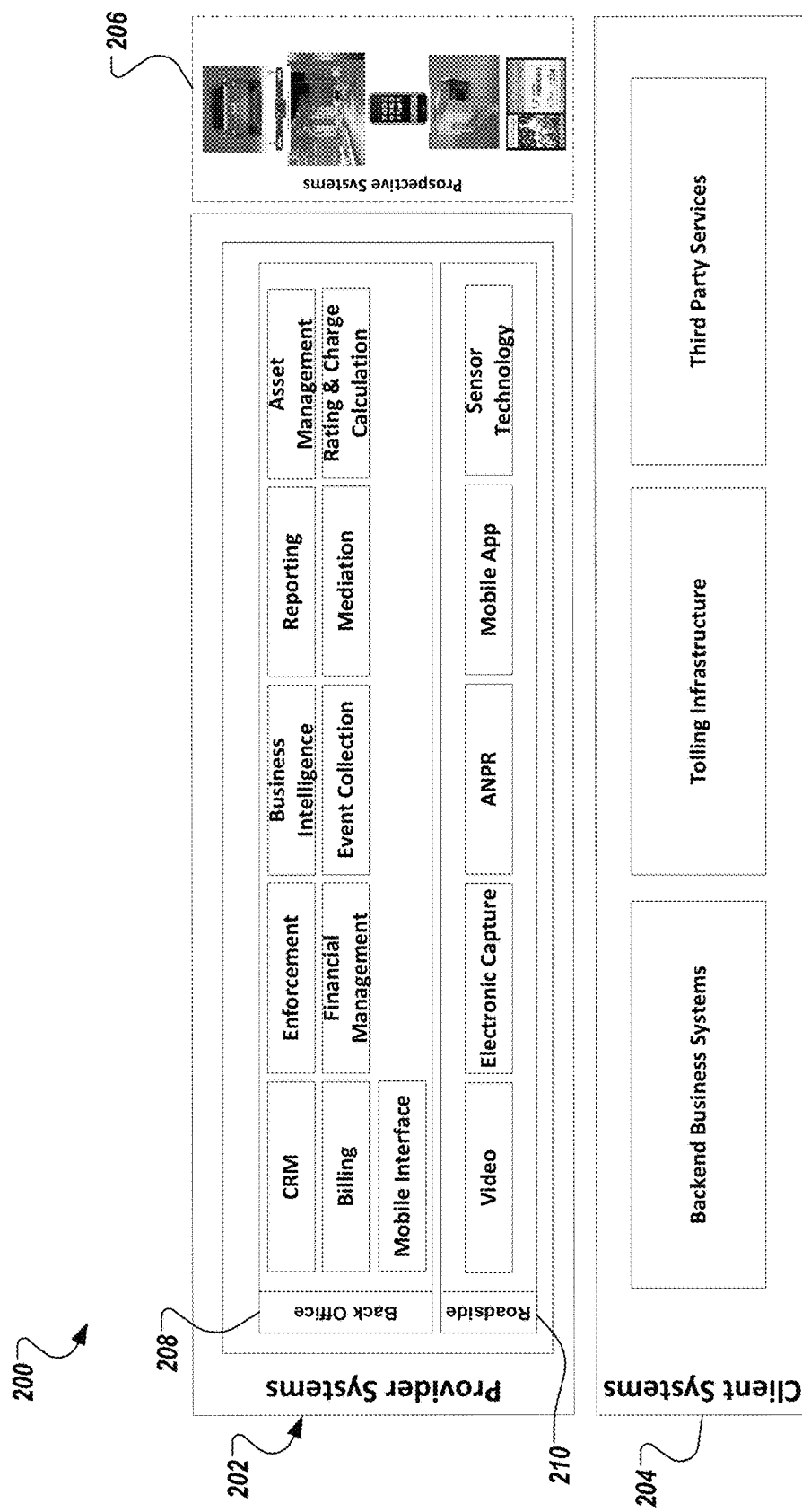
FIG. 2 is a diagram illustrating an exemplary framework for implementing a tolling integration system.

In some examples, a provider may offer tolling integration services to a client. The provider may leverage its existing tolling services and solutions to provide an open framework, allowing for systems and infrastructure provided by the client (as well as prospective new technologies) to be efficiently incorporated therewith. FIG. 2 illustrates an exemplary framework 200 for implementing a tolling integration system (e.g., tolling integration system 100). Framework 200 includes provider systems 202, client systems 204, and prospective systems 206. Provider systems 202 represent existing tolling services and solutions offered by a provider. For example, a provider may offer back office tolling services 208 and/or roadside tolling services 210.

Back office tolling services 208 may include any business operations suitable for supporting tolling integration. In this example, back office tolling services 208 include (CRM) Customer Relationship Management (e.g., query and complaints management, user account management, and/or customer contact management services), Enforcement (e.g., debt collection and/or representations and appeals services) Business Intelligence (e.g., predictive analysis, and/or data repositories services), Reporting (e.g., standard and ad hoc reporting services) Asset Management (e.g., order management and/or media returns management services), Billing (e.g., payment processing, invoicing, and/or transaction clearing services), Financial Management (e.g., accounts payable, auditing, and/or accounts receivable services), Event Collection (e.g., transaction validation and security services), Mediation (e.g., event correlation and/or event aggregation services), Rating and Charge Calculation (e.g., tolling charge determination and/or custom pricing services), and/or Mobile Interface (e.g., mobile application services) capabilities.

In addition to back office tolling services 208, a provider may offer roadside tolling services 210. Roadside tolling services may include any offerings related to physically implementing a tolling network (e.g., a collection of tolled roads). In this example, roadside tolling services 210 include Video (e.g., high resolution video cameras and supporting equipment/software), Electronic Capture (e.g., RFID equipment and supporting software), (ANPR) Automatic Number Plate Recognition (e.g., optical character recognition technology and license plate data sources), Mobile Application (e.g., application development and implementation services for road usage data collection), and Sensor Technology (e.g., thermal and/or infrared monitoring services) capabilities.

Client systems 204 may include any existing resources provided by the client that may be used by a provider implementing a tolling integration system. In some examples, client systems 204 (e.g., Backend Business Systems, Tolling Infrastructure, and Third Party Services) may be leveraged by a provider to deliver a more comprehensive tolling framework. For instance, roadside tolling services 208 may utilize the existing tolling infrastructure of a client (e.g., gantries, toll booths, toll signage, etc.) for implementing roadside tolling services.

Prospective systems 206 represent possible future tolling technologies. In some examples, a provider may offer a tolling framework operable to incorporate new systems as they become available. For instance, prospective systems 206 may be incorporated into the existing framework by including associated data sources into the supporting communications network and updating one or more back office tolling services 208 (e.g., Rating & Charge Calculation services) to process new information provided by the prospective systems.

In some embodiments, there may be no clear demarcation between systems 202 and 204. That is, provider systems 202 may provide some functionality currently described under client systems 204 and vice versa. Furthermore, in some embodiments, the entire functionality of systems 202 and 204 may be provided by one entity. In alternate embodiments, any combination of systems 202 and 204 may be provided by any combination of entities without departing from the scope of this disclosure.

Figure 3:
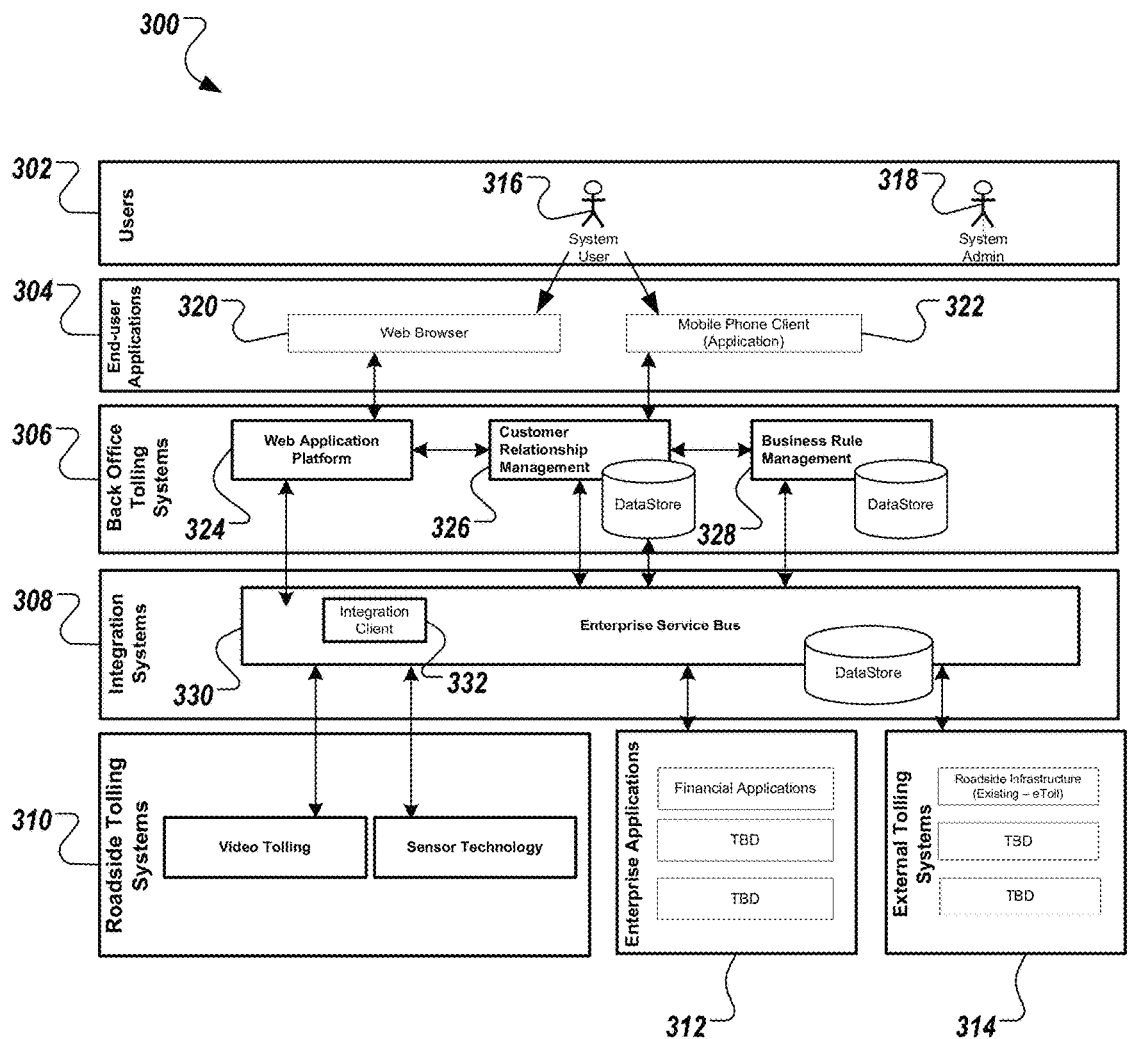
FIG. 3 is a diagram illustrating an exemplary system architecture for implementing a tolling integration system.

FIG. 3 illustrates an exemplary system architecture 300 for implementing a tolling integration system (e.g., tolling integration system 100). System architecture 300 includes multiple structured components configured to efficiently achieve tolling integration. For example, as shown, system architecture 300 includes users 302, end-user applications 304, back office tolling systems 306, integration systems 308, provider roadside tolling systems 310, enterprise applications 312, and external tolling systems 314 (e.g., existing client systems).

Users 302 represent high-level actors of a tolling integration solution. In an example implementation, users 302 include system users 316 and system administrators 318. System users 316 may be entities who have registered with a provider through back office tolling systems 306 and provided some basic information about themselves (e.g., biographic information, financial information, vehicle type, preferences, common destinations, etc.). System users 316 may often be a source of data and interaction in the architecture 300, though variations of the exact role of the system users 316 may exist depending on the use case. System administrators 318 are backend users that support various components of the system (e.g., customer service, technical support, specific component administrators/development teams, etc.).

End user applications 304 provide front-end applications/interfaces with which system users 316 may directly interact. In this example, end-user applications 304 include web browser 320 and mobile device application 322. Web browser 320 provides a placeholder for a system portal or website. The website may allow for system users 316 to create an account, authenticate securely, and/or update personal information. Such a website also may provide a conduit of information to back office tolling system 306 for processing and executing business rules and logic. The web application provides an interface for the customer (e.g., system users 316) to obtain and edit their account information, as well as a source component of information and data to back office tolling systems 306.

Mobile device application 322 may allow system users 316 to communicate road usage information as well as other information (e.g., transaction data, preferences, etc.) to back office tolling systems 306. The communicated road usage data in combination with other tolling data may provide the back office tolling systems a data set to accurately calculate/determine the appropriate toll to be assessed. Mobile device application 322 may leverage bi-directional communication, such that in addition to sending information to back office tolling systems 306, it also may accept communication (e.g., messages, alerts, advertisements, incentives, etc.) from the back office tolling systems 306.

Back office tolling systems 306 may include any computer hardware and/or software suitable for supporting back office tolling services 208 (see FIG. 2, for examples). For instance, in an example implementation, back office tolling systems 306 include web application platform 324, enterprise resource planning/customer relationship management applications 326, and business rules management system 328.

Integration systems 308 are configured to receive and process tolling data from a plurality of data sources (e.g., provider roadside tolling systems 310, and external tolling systems 314). In an example implementation, integration systems 308 include enterprise service bus 330. Enterprise service bus 330 may be operable to communicate with many different types of data sources through adapters, and to pre-process tolling data received from the data sources (via integration client 332), such that the tolling data may be utilized by back office tolling systems 306. Enterprise service bus 330 also may communicate with enterprise applications 312 which provide business-oriented tools to supplement existing back office tolling services of the provider. Enterprise service bus 330 further may communicate with external tolling systems 314 to receive tolling data collected by the external tolling systems 314. In an example embodiment, the functionality of Enterprise service bus 330 may be performed by Microsoft Biz Talk Server. However, in other embodiments, other tools may be used to perform this functionality without departing from the scope of this disclosure.

Figure 4:
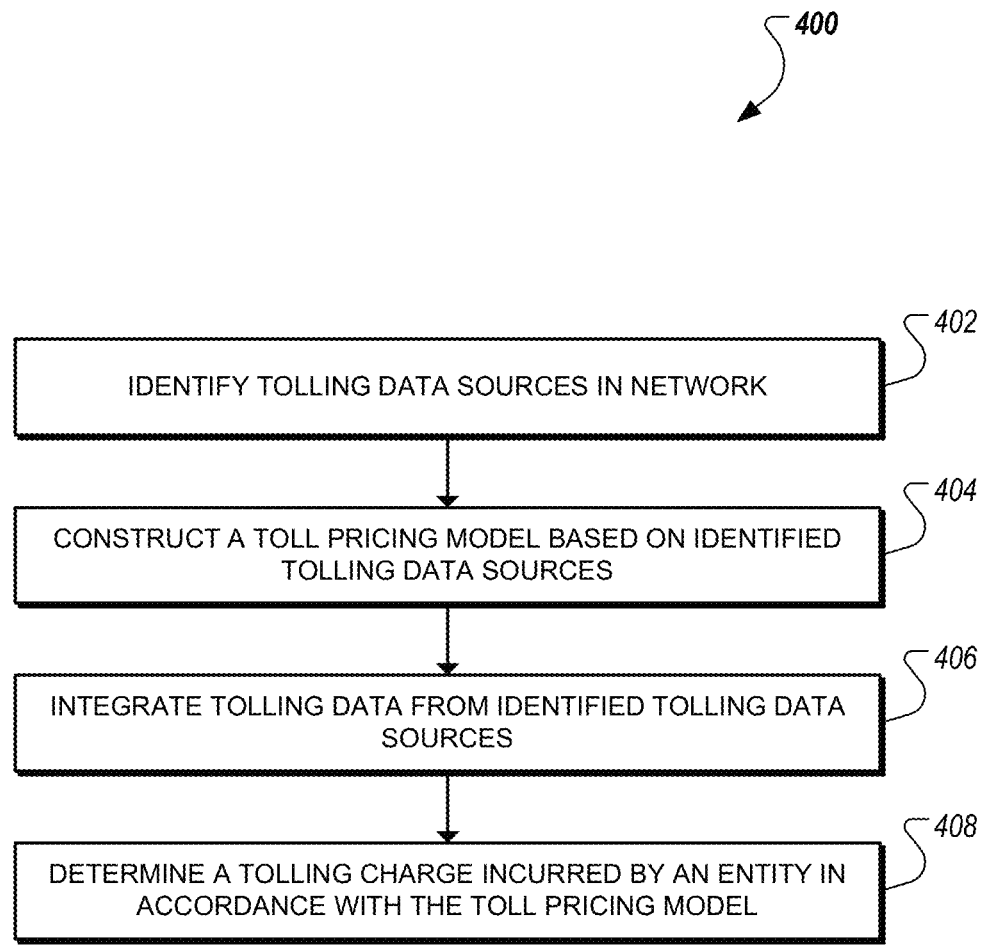
FIGS. 4, 6A, 6B, 8, 11, and 13 are flowcharts of exemplary processes.

FIG. 4 illustrates an exemplary tolling process 400 that may be performed by a tolling system (e.g., tolling system 102). As shown, tolling process 400 includes identifying tolling data sources in a network, at operation 402. The tolling system may identify tolling data sources via any suitable method. Further, the tolling system may identify new data sources as they become available on the network.

In some examples, the tolling system may query a database to identify tolling data sources. The database may store information corresponding to a plurality of data sources that are coupled to the system through a network. In these examples, the database query may return an identifier corresponding to one or more of the data sources. The data source identifiers may include metadata describing the type of data collected by the data source and/or the location and status of the data source.

In some example implementations, the tolling system may receive information identifying data sources through a user interface. For example, a user may provide data source identifiers through the user interface. Additionally, the tolling system may utilize an echo-reply routine (e.g., a ping routine) to identify coupled data sources in a network. For instance, the tolling system may transmit a generic echo request and may receive an echo reply from a data source identifying itself. The echo reply may provide a data source identifier.

Tolling process 400 also includes constructing a toll pricing model based on identified data sources, at operation 404. For example, a tolling system may construct a toll pricing model (see FIG. 5, for example) by integrating multiple discrete tolling rules. The tolling rules may be generated based on the types of data collected by identified data sources. Further, in some examples, the tolling system may reconstruct a previously constructed toll pricing model based on new types of data collected by additional data sources as they are added to the network.

Tolling process 400 also includes integrating tolling data from identified data sources, at operation 406. For example, a tolling system may store, in a common database, tolling data received from coupled and identified data sources. The stored data may be organized in the database by vehicle or according to the entity associated with the vehicle. Further, in some examples, the tolling system may integrate new data collected by additional data sources as they are added to the network.

Tolling process 400 further includes determining a tolling charge incurred by an entity in accordance with a toll pricing model, at operation 408. For example, a tolling system may apply a set of tolling rules, in sequence according to a toll pricing model, to a data set describing road usage by a vehicle or entity to determine an incurred toll charge.

Figure 5:
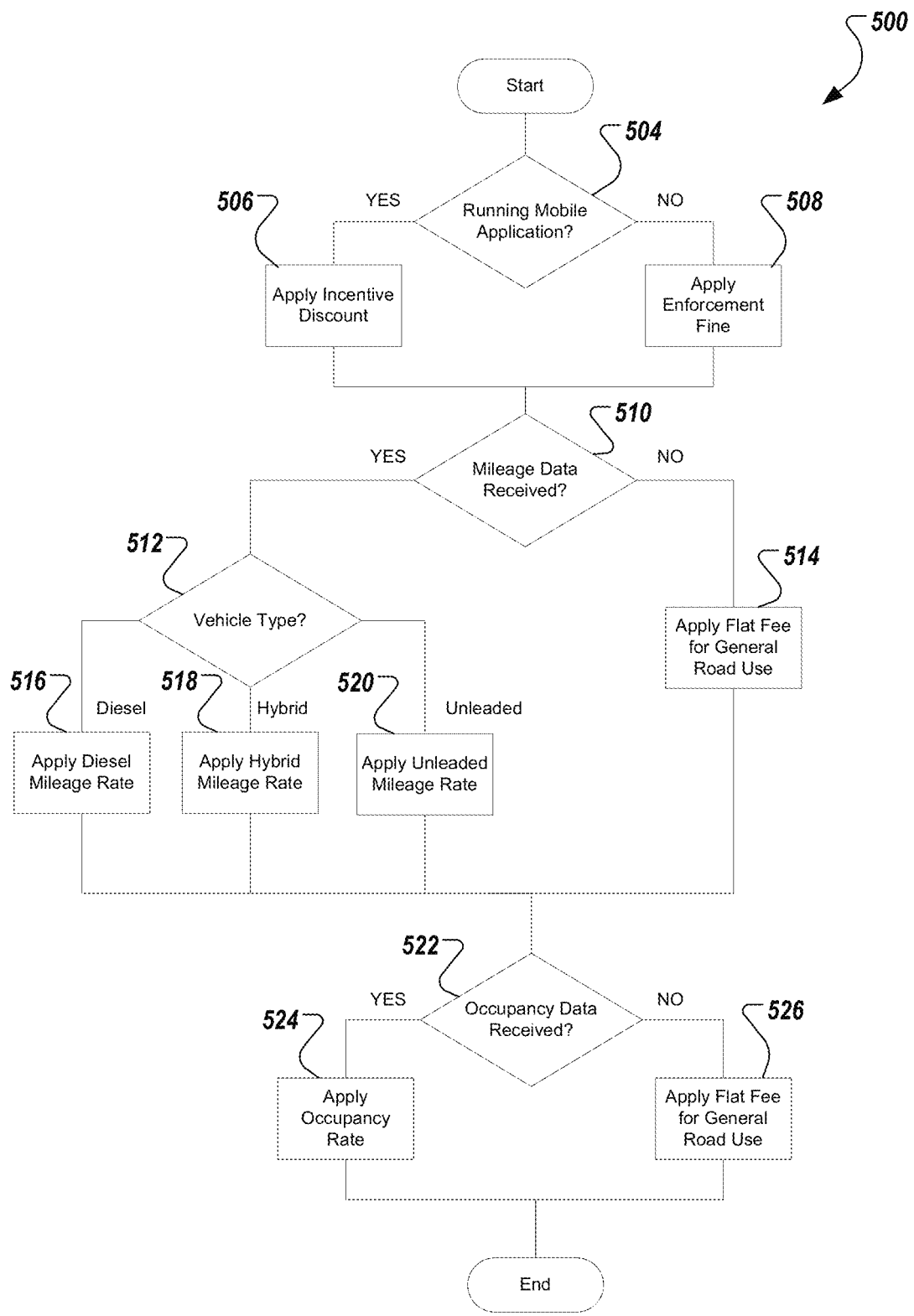
FIG. 5 is a flow diagram illustrating an exemplary toll pricing model.

FIG. 5 illustrates an exemplary toll pricing model 500. Toll pricing model 500 may be utilized to determine an incurred toll charge by applying a plurality of tolling rules to a set of integrated tolling data. For example, elements 504, 506, and 508 of the toll pricing model represent a first tolling rule, which may read as follows:
 if DATA COLLECTION APPLICATION is running,
 then APPLY incentive discount,
 else APPLY enforcement fine.

According to the first tolling rule, if an entity or vehicle is running a data collection application (for example, a mobile phone application for collecting and transmitting road usage data to a toll system), an incentive discount is applied to the total tolling charge incurred. If the entity or vehicle is not running such an application, an enforcement fine is applied to the overall tolling charge. This example tolling rule may encourage users to voluntarily provide road usage information by running the data collection application (described in greater detail below).

Elements 510, 512, 514, 516, 518, and 520 apply a second tolling rule, which reads as follows:
 if MILEAGE DATA is received,
 then DETERMINE charge based on vehicle type,
 else APPLY flat fee for general road usage.

According to this tolling rule, if mileage data for the entity or vehicle is provided (e.g., via the data collection application or one or more other data sources), then a mileage charge is determined based on the vehicle type. In this example, mileage rates based on vehicle fuel type are used. Respective mileage rates for diesel (516), hybrid (518), and unleaded (520) vehicles may be determined based on general fuel efficiency and/or pollution factors (other suitable factors may also be considered in determining mileage rates). For example, in some cases, a diesel mileage rate (516) may be higher than a hybrid mileage rate (518) and an unleaded mileage rate (520) because diesel vehicles typically create more pollution. In such cases, the hybrid mileage rate (518) may be implemented as a credit (as opposed to a charge) to encourage entities to purchase more environmentally conscious vehicles. In some other cases, a hybrid mileage rate (520) may be higher than a diesel mileage rate (516) and an unleaded mileage rate (520) because hybrid vehicles are typically more fuel efficient, and thus owners of such vehicles tend to pay less taxes on gas. If the mileage data is not available, a flat fee for general road usage will be applied (514).

Elements 522, 524, and 526 apply a third tolling rule, which reads as follows:
 if OCCUPANCY DATA is received,
 then APPLY occupancy tolling rate,
 else APPLY flat fee for general road usage.

According to this tolling rule, if occupancy data (e.g., the number of passengers in a vehicle) is received (522), an occupancy rate is charged (524). Otherwise, a flat fee for general road usage is used (526).

A toll charge incurred by an entity or vehicle may be determined based on the toll rules discussed above. The rates, fees, fines, and discounts specified by the tolling rules are arbitrary and may be determined through any suitable method. For instance, rates, fees, fines, and discounts may be determined based on revenue goals, traffic congestion, weather conditions, etc. More specifically, for example, a mileage rate may be determined as a function of air quality and traffic congestion (as well as other factors, such as vehicle type, as discussed above), such that the mileage rate increases with increasing traffic congestion and/or degrading air quality. In this way, entities owning vehicles traveling in poor air quality and high traffic congestion conditions are charged more per mile than entities owning vehicles traveling in good air quality and light traffic congestion conditions.

Further, although this example toll pricing model includes three exemplary tolling rules, any suitable number of tolling rules may be integrated into a toll pricing model. Further still, although toll pricing model 500 is expressed graphically herein, toll pricing models may be expressed mathematically or symbolically as well, for example.

Figure 6A:
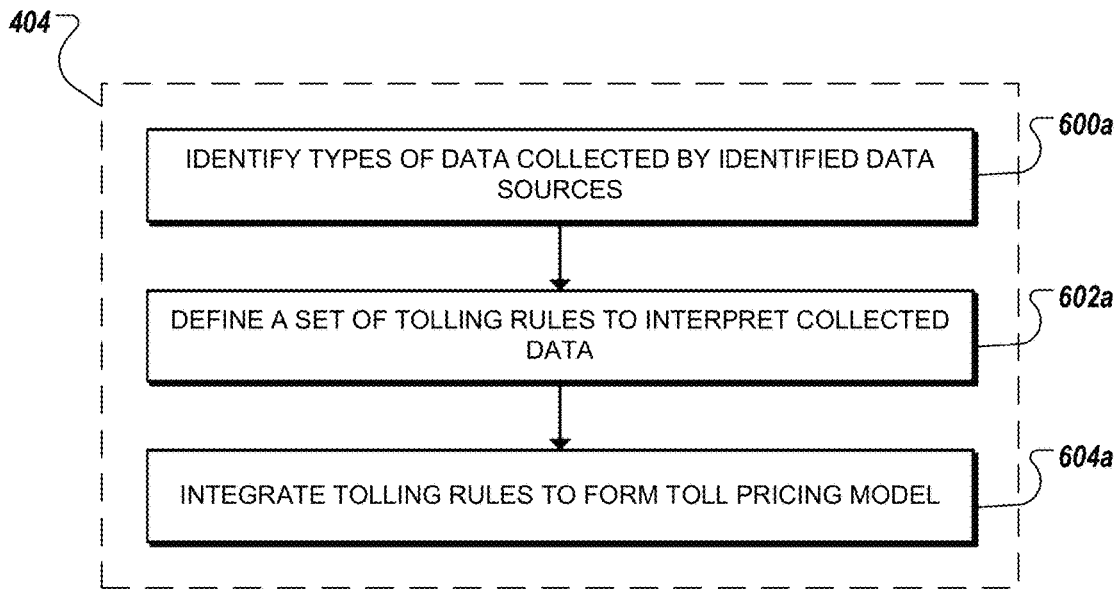

FIG. 6A illustrates a first exemplary process for constructing a toll pricing model (see FIG. 4, operation 404). The operations of the process may be performed by a tolling system (e.g., tolling system 102). For example, a tolling system may identify types of data collected by identified data sources, at operation 600a. The types of data collected may be specified in metadata of a data source identifier or determined by the toll system via any other suitable method.

The tolling system also may define a set of tolling rules to interpret collected data, at operation 602a. Tolling rules may be defined by any suitable method. For example, tolling rules may be automatically generated according to a schema stored in a memory of the tolling system. A set of tolling rules also may be defined by receiving user input through a user interface. For example, a user may interact with the tolling system to define a set of tolling rules.

The tolling system may integrate tolling rules to form a toll pricing model (e.g., toll pricing model 500), at operation 604a. In some examples, tolling rules may be integrated by simply specifying a prescribed order in which the rules are applied to a data set of tolling information. In other examples, tolling rules may be integrated by combining similar or redundant rules. Integrating tolling rules also may include determining specific monetary amounts for any rates, fees, fines, and discounts specified by the tolling rules. These values may be determined in view of the number and/or type of integrated tolling rules. For example, a tolling model incorporating several tolling rules may set forth lower rates for each type of tolling charge than a tolling model incorporating a lesser number of tolling rules.

Figure 6B:
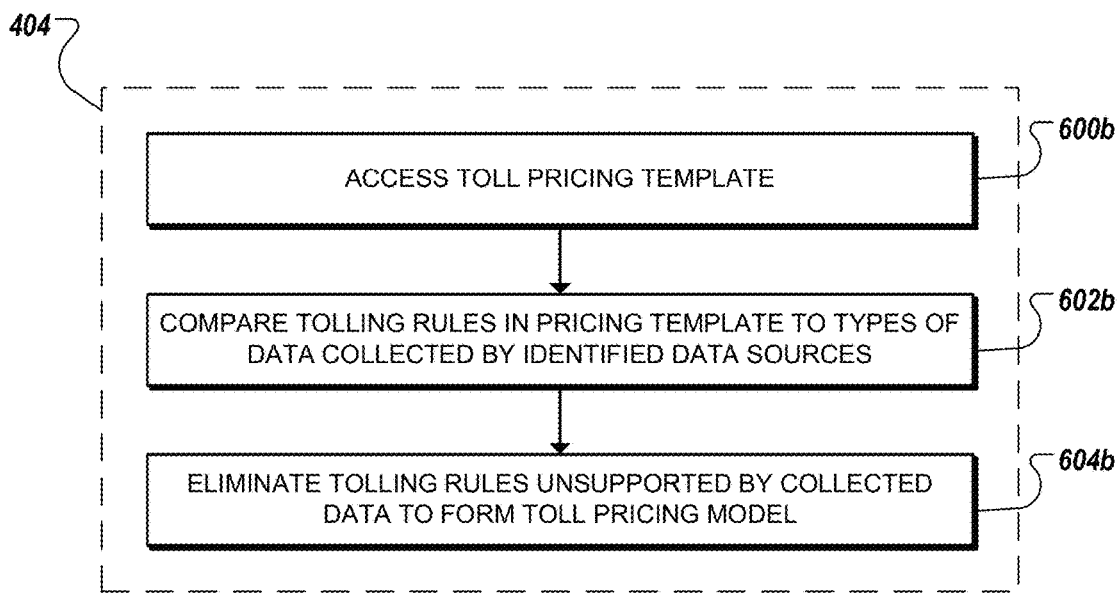

FIG. 6B illustrates a second exemplary process for constructing a toll pricing model. As shown, a tolling system may access a toll pricing template (or repository), at operation 600b. The toll pricing template may be stored in a memory of the toll pricing system as a predefined set of tolling rules. The predefined tolling rules may be automatically generated, downloaded, or received via user interface. The toll pricing template also may include a generic toll pricing model incorporating a set of generic tolling rules.

The tolling system may compare the predefined tolling rules in the template to the types of data collected by identified data sources, at operation 602b. The tolling system then may eliminate tolling rules that are unsupported by the collected data to form a toll pricing model, at operation 604b.

Figure 7:
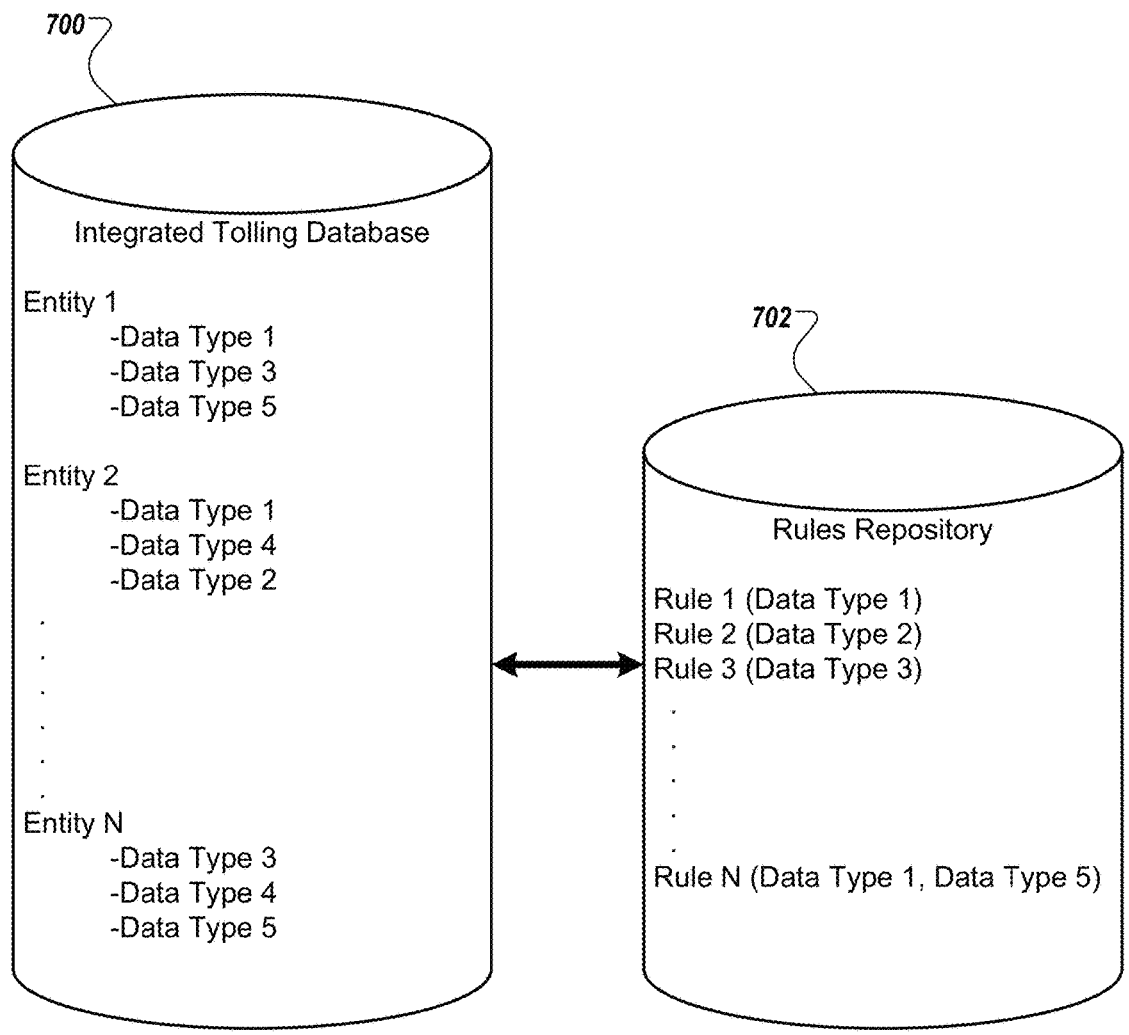
FIG. 7 is a diagram illustrating an integrated tolling database and a tolling rules repository.

FIG. 7 illustrates an integrated tolling database 700 and a tolling rules repository 702. The database 700 and repository 702 may be components of a tolling system (e.g., tolling system 102). As shown, database 700 stores tolling data collected by a plurality of data sources. In this example, the tolling data is organized by entity and data type (for example, data type one may be distance travelled data, data type two may be vehicle occupancy data, etc.). For instance, data of types One, Three, and Seven were collected and associated with Entity One, data of types One, Four, and Two with Entity Two, and so on for N number of entities.

Repository 702 stores a set of generic tolling rules that may be used to determine a tolling charge incurred by each entity. As shown, each tolling rule is function of one or more data types. For example, Rule One is a function of Data Type One, Rule Two a function of Data Type Two, and so on. Tolling rules may be a function of any suitable data type and any appropriate number of suitable data types.

As described above with respect to FIG. 6B, a toll pricing model may be constructed by comparing the types of data stored in database 700 with the rules stored in repository 702. In some examples, a toll pricing model common to each entity may be constructed in this way. In other examples, multiple toll pricing models may be constructed by integrating rules associated with common combinations of data. For example, if data of types One, Three, and Five are commonly collected in a certain area or jurisdiction, a tolling model applicable to such a combination of data types may be provided.

Figure 8:
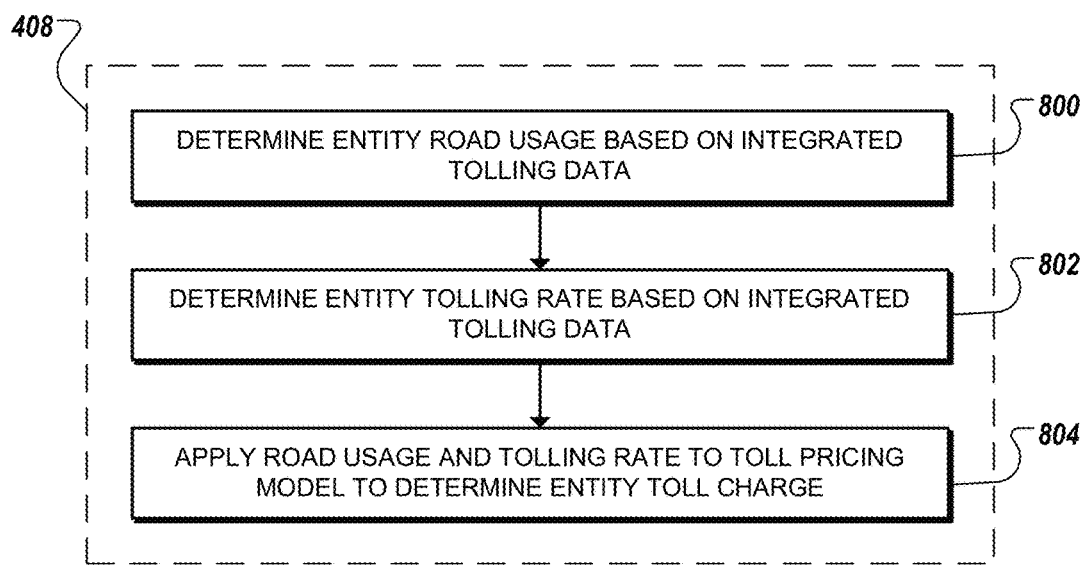

FIG. 8 illustrates a first exemplary process for determining a tolling charge incurred by an entity in accordance with a tolling pricing model (see FIG. 4, operation 408). The operations of the process may be performed by a tolling system (e.g., tolling system 102). As shown, the tolling system may determine road usage for an entity based on integrated tolling data, at operation 800. Road usage may be described by any number of suitable factors. For example, road usage may be described through mileage data, vehicle type, occupancy data, etc., as described above.

The tolling system may determine a tolling rate for an entity based on integrated tolling data, at operation 802. A tolling rate may include any tolling charge (or discount) that is based on tolling data. For example, a flat tolling rate for general road usage may be determined based on tolling revenue data (e.g., revenue targets and total revenue generated). In another example, a tolling rate for mileage may be determined based on the type of vehicle (see toll pricing model 500, elements 516, 518, and 520). The tolling system then may apply road usage and tolling rate information to the toll pricing model to determine a toll charge incurred by the entity, at operation 804.

Figure 9A:
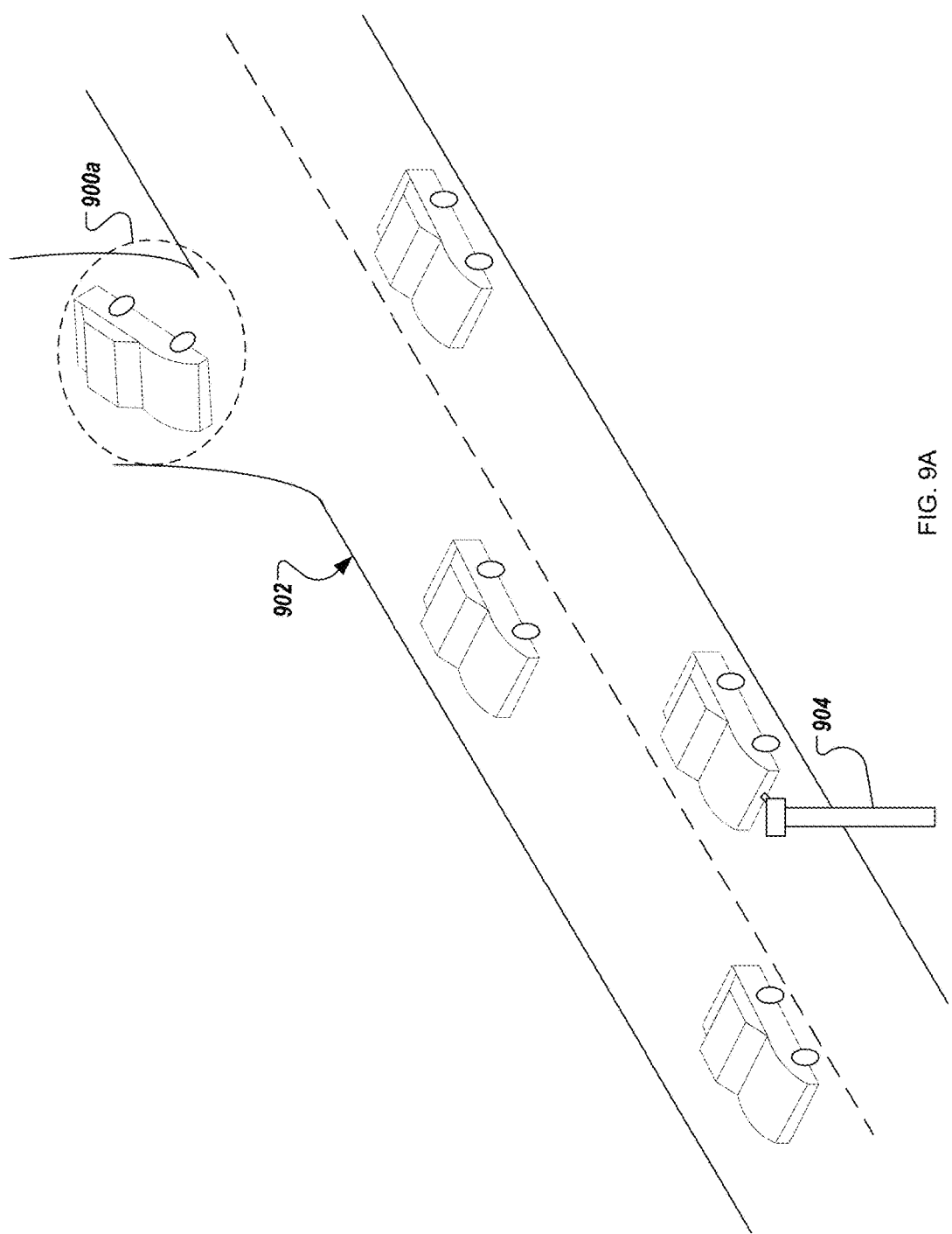
FIGS. 9A and 9B are diagrams illustrating an exemplary dynamic tolling implementation.
Figure 9B:
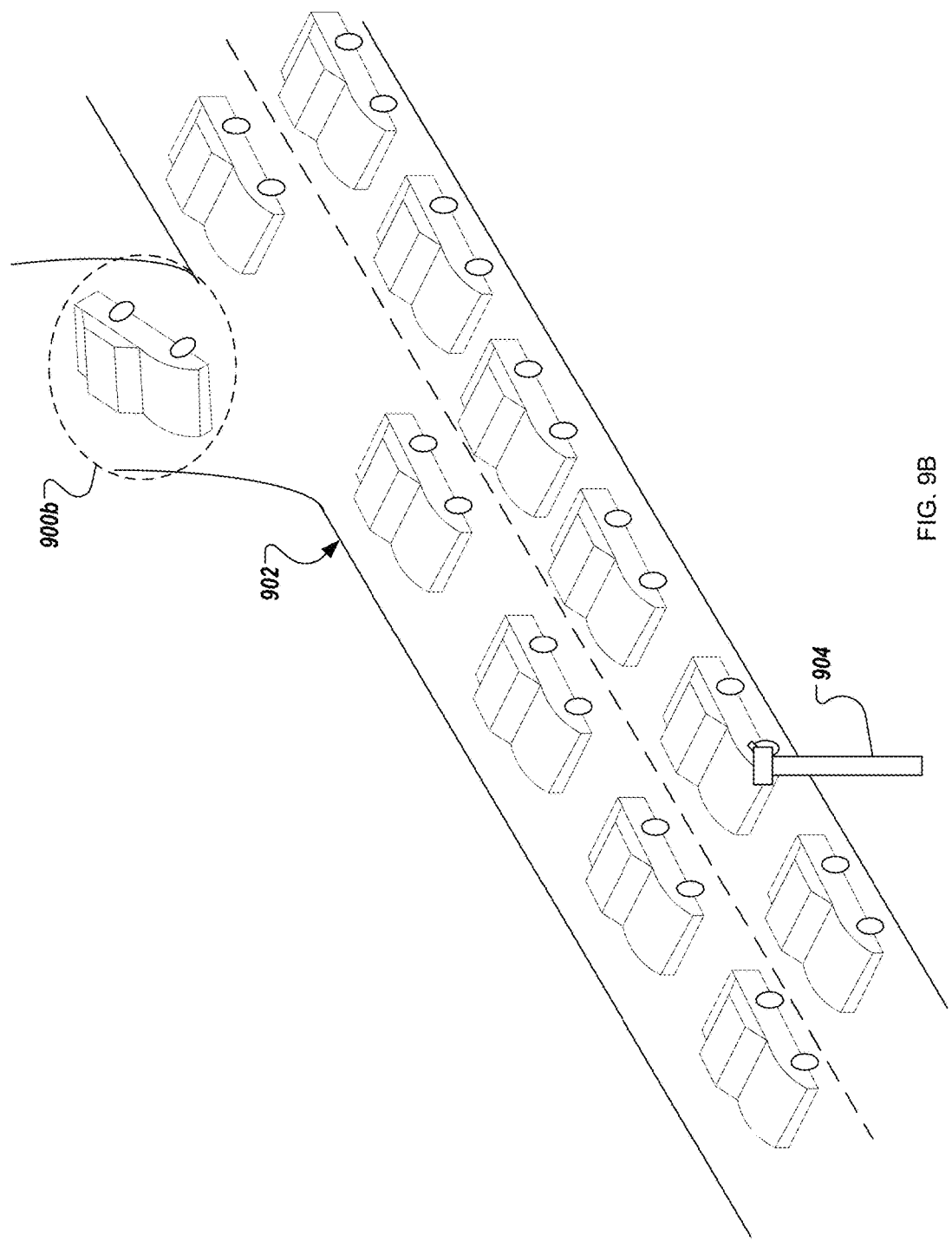

FIGS. 9A and 9B are diagrams illustrating an exemplary dynamic tolling implementation. In FIG. 9A, a vehicle 900a enters onto toll road 902 in light traffic conditions (e.g., low traffic congestion). Traffic conditions are monitored by data source 904 and transmitted to a tolling system (e.g., tolling system 102). In FIG. 9B, a vehicle 900b enters onto toll road 902 in heavy traffic conditions (e.g., high traffic congestion). In this example, a toll pricing model governing incurred toll charges may be updated dynamically based on traffic conditions. For instance, a tolling rate (e.g., a tolling rate based on mileage data) may be increased in relatively heavy traffic conditions and decreased in relatively light traffic conditions, such that vehicle 900a is charged a lower tolling rate than vehicle 900b. In this way drivers are discouraged from entering onto a busy tolled road and further attributing to the heavy traffic conditions. Similarly, in some examples, the toll pricing model may be updated based on date and time to account for likely traffic patterns. Further, in some example implementations, an entity associated with vehicle 900b may receive an alert (for example, via a mobile device application) indicating that the tolling rate for traveling on toll road 902 has increased.

Figure 10A:
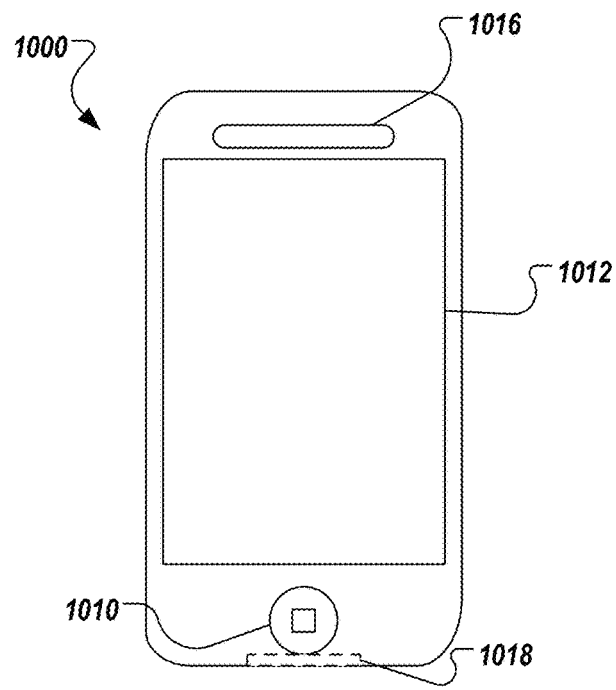
FIGS. 10A and 10B are diagrams illustrating an exemplary mobile processing device.
Figure 10B:
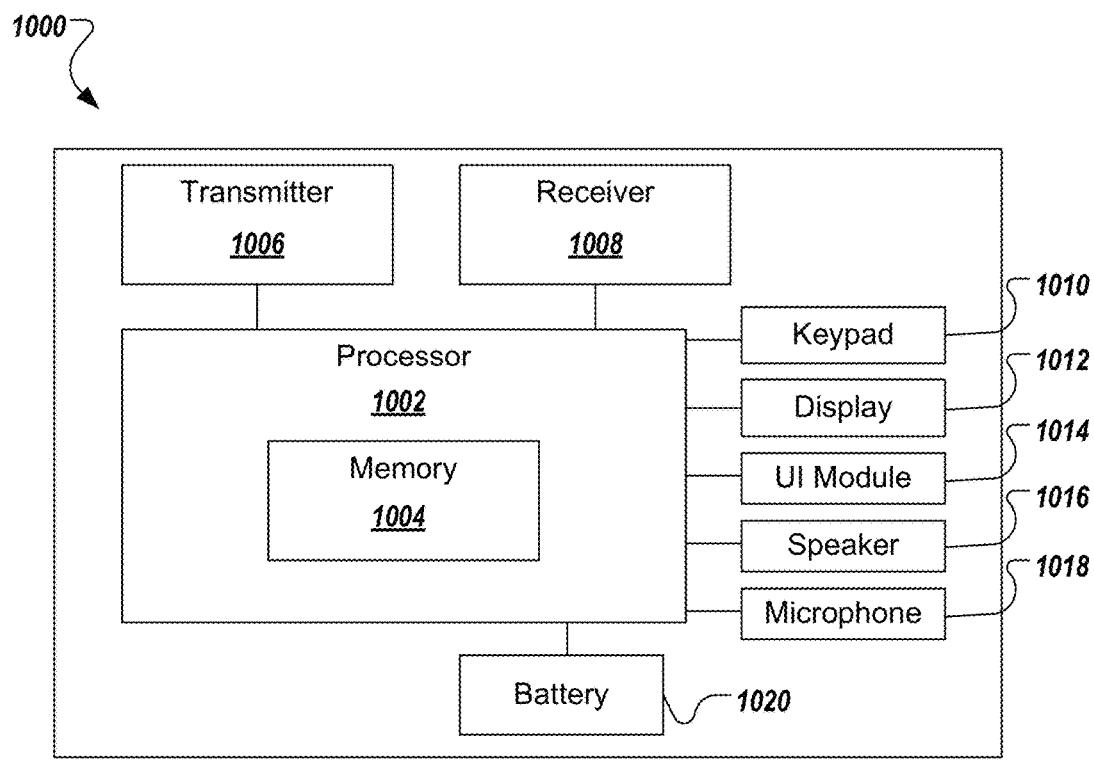

FIGS. 10A and 10B illustrate an exemplary mobile processing device 1000. As shown, the mobile processing device includes a processor 1002, memory 1004 (e.g., computer readable media, read-only memory (ROM), random access memory (RAM), flash memory, a hard disk, or any combination thereof), a transmitter 1006, a receiver 1008, a keypad 1010 (e.g., a soft key), a display 1012, a UI module 1014 (e.g., a graphical user interface module for touchscreen devices), a speaker 1016, a microphone 1018, and a battery 1020. Processor 1002 controls each component of the mobile processing device 1000 and may access memory 1004 to run applications stored in the memory. Transmitter 1006 and receiver 1008 transmit and receive signals (e.g., via one or more antennas) to other communication devices, base stations, computers (e.g., tolling system 102), satellites (e.g., GPS satellites), and/or wireless access points. Keypad 1010, display 1012, UI module 1014, speaker 1016, and microphone 1018 are input/output devices for communicating with a user. Battery 1020 provides power to appropriate components of the mobile processing device.

Mobile processing device 1000 may store a mobile device application. The application may be provided as a client-side application that facilitates tolling by communicating with a tolling system (e.g., tolling system 102). For example, the mobile device application may be configured to collect road usage data and to transmit such data over a network to the tolling system. In some examples, data collection by the mobile device application may commence automatically when the application is launched by a user. In other examples, however, data collection may begin when the user selects a specific option provided by the application or when some external signal is received (e.g., an RFID signal).

Road usage data may be collected by any suitable method. For example, a user may provide road usage data (e.g., occupancy data, vehicle type, etc.) through a user interface of mobile processing device 1000. Road usage data also may be collected by accessing an on-board vehicular computing unit via a wireless network, such as a Bluetooth network. Mileage data, fuel efficiency data, emissions data, etc. may be collected from the on-board computing unit. In some examples, road usage data may be collected by accessing a global positioning system (GPS) via global positioning system hardware (e.g., transmitter 1006 and receiver 1008) incorporated into mobile processing device 1000. The application may receive a geographic positioning signal (e.g., location data) from the GPS and subsequently determine a current location and/or speed of the vehicle. Origin and destination information, as well as distance of travel, also may be determined in this way. Such information also may be determined by communicating with a third party mapping service.

In addition to road usage data, the mobile device application also may be configured to transmit an identifier distinguishing a vehicle (e.g., a license plate number) or an entity associated with the vehicle (e.g., the name of an individual or organization that owns the vehicle) to the tolling system. The application also may receive toll charge data from the tolling system based on the previously collected and transmitted road usage data.

Figure 11:
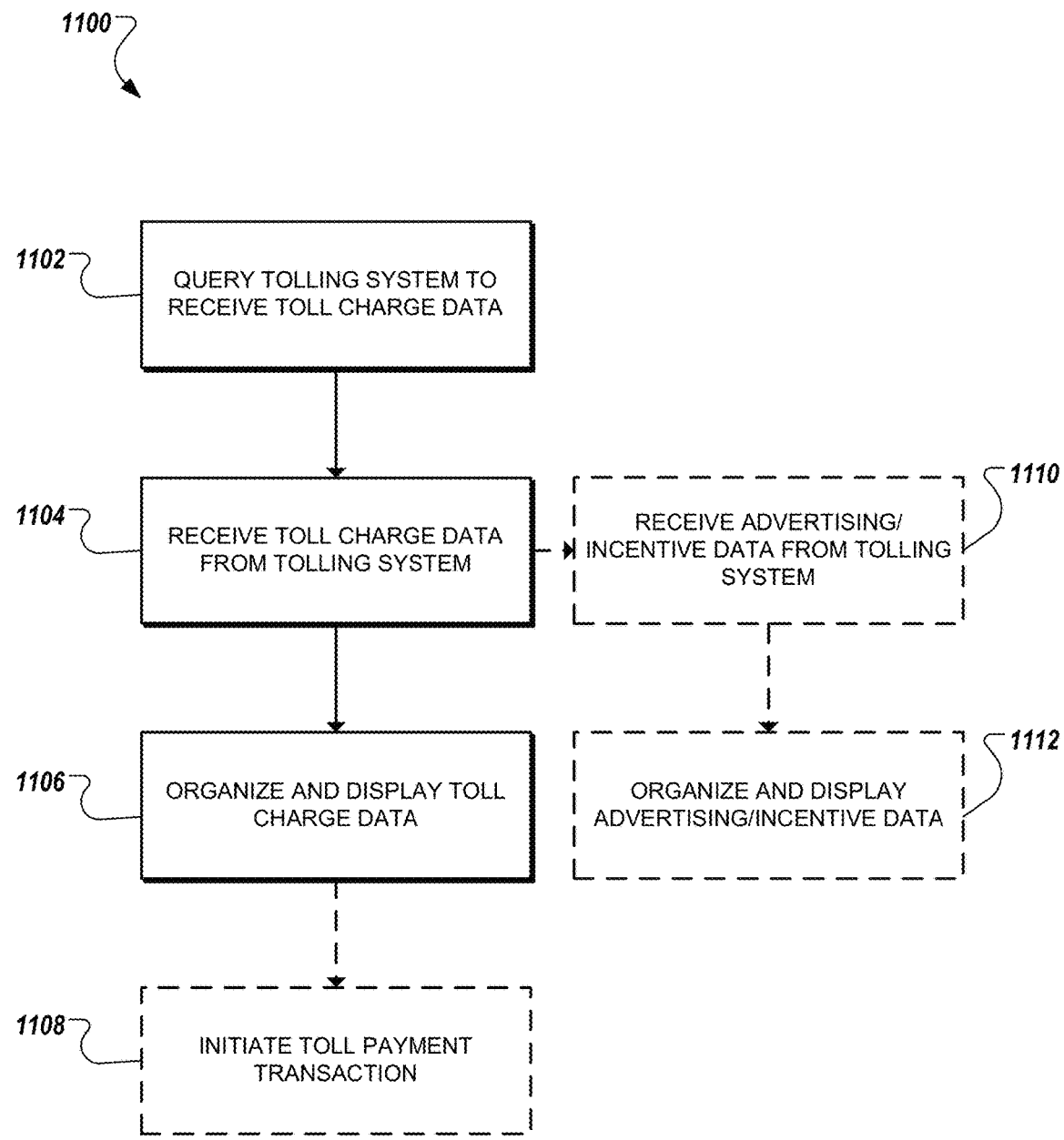

FIG. 11 is an exemplary tolling process 1100 that may be performed by a mobile device application running on a mobile processing device (e.g., mobile processing device 1000). As shown, tolling process 1100 includes querying a tolling system to receive toll charge data, at operation 1102. The mobile device application also may receive, organize and display the toll charge data, at operations 1104 and 1106.

In some example implementations, the application may initiate a toll payment transaction, at operation 1108. The transaction may be initiated with the tolling system or a third party financial institution. For example, the mobile device application may provide a local or web-based page for accepting payment information (e.g., credit or debit card information, promotional codes, etc.). The payment information may be received through the user interface of a mobile device running the application and subsequently transmitted to an appropriate business entity. In some examples, program instructions for obtaining payment information may be stored in a memory of the mobile device. For example, payment information may be retrieved automatically from a user profile, such that the toll payment transaction can be initiated and completed automatically, without user interaction.

In some cases, in addition to (or in lieu of) the toll charge data, the mobile device application also may receive, organize and display advertising or incentive data, at operations 1110 and 1112. In some example implementations, appropriate advertising and/or incentive data is determined by a tolling system based on road usage data. For example, ads may be presented to users for businesses (e.g., restaurants, department stores, car dealerships, etc.) near current or typical routes traveled. Ads for businesses offering services comparable to businesses currently or previously visited may also be presented to a user of the mobile device application.

Figure 12A:
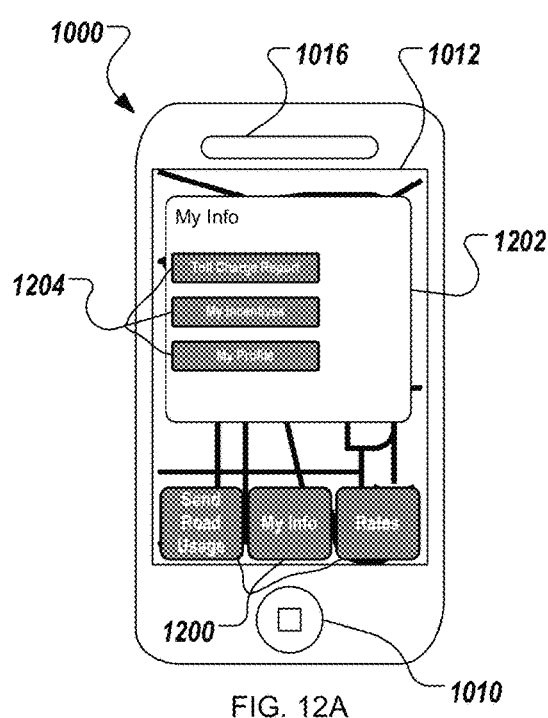
FIGS. 12A-12D illustrate an exemplary mobile application device running on the mobile processing device of FIGS. 10A and 10B.
Figure 12B:
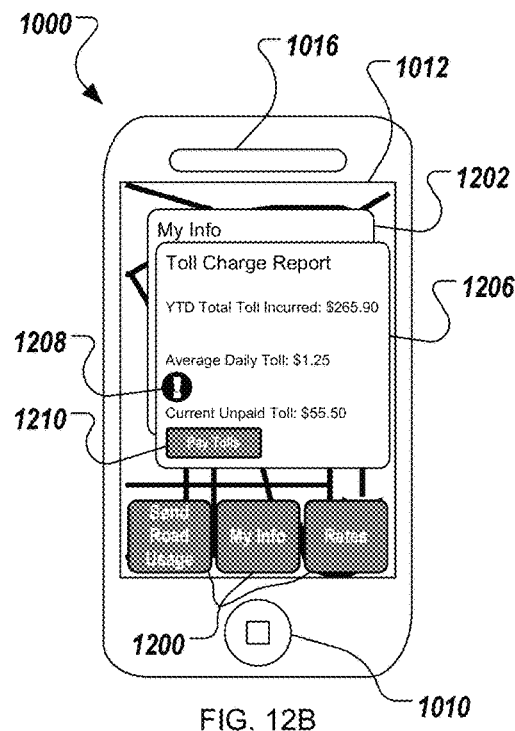

FIGS. 12A-12D illustrate an example mobile application device running on mobile processing device 1000. As shown, the application may present several selectable menu items 1200 (i.e., Send Road Usage, My Info, and Rates) to a user. In response to selection of a menu item, an application page may be displayed. For example, FIG. 12A shows mobile processing device 1000 displaying application page 1202 (i.e., the My Info application page). Application page 1202 presents several additional selectable sub-menu items 1204 (i.e., Toll Charge Report, My Incentives, and My Profile). In response to selection of a sub-menu item, a sub application page may be displayed. For example, FIG. 12B shows mobile processing device 1000 displaying sub-application page 1206 (i.e., the Toll Charge Report sub-application page).

As mentioned above, the mobile device application may organize and display received toll charge data. Sub-application page 1206 presents such data on the display of mobile processing device 1000. For example, sub-application page 1206 presents information relating to tolls incurred by an entity, such as YTD tolls incurred, average toll, and current unpaid toll. An alert also may be displayed on an application or sub-application page. For example, usage alert 1208 on sub-application page 1206 indicates that that an unpaid toll has met or exceeded a predetermined threshold. In addition to a visual indication, alerts (such as usage alerts) may be communicated to a user via an audial indication (e.g., a ring or a beep) or a tactile indication (e.g., a vibration). Sub-application page 1206 also provides an additional selectable item 1210 (i.e., Pay Tolls) for initiating a toll payment transaction (see operation 1108 of tolling process 1100) to settle the unpaid toll. In some other examples, however, payment transactions for incurred toll charges may be initiated automatically, without user interaction.

Figure 12C:
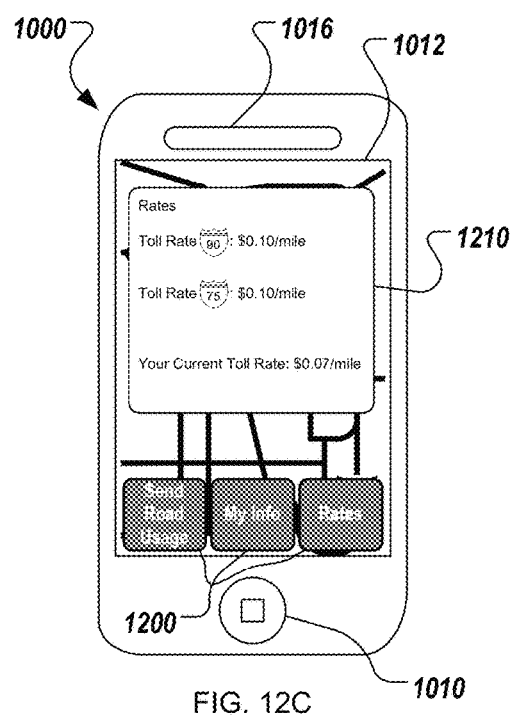

FIG. 12C shows mobile processing device 1000 displaying an application page 1210 (i.e., the Rates application page). As shown, application page 1210 provides additional toll charge data, such as expected and current toll charge rates. In some other examples, application page 1210 may provide purchase rates on fuel in addition to, or in lieu of, toll charge rates. The toll charge and/or fuel purchase rates may be determined by a tolling system based on road usage information provided by the mobile device application. In this way, individual rates for tolling and/or fuel purchasing can be determined on an individual basis for each entity (or for classes of entities, such as fleet vehicle owners, individuals earning more or less than certain salary thresholds, etc.) in view of individual road usage and other factors.

In some examples, the mobile device application may be further operable to provide an alert indicating that toll rate for a current or frequently traveled road has exceeded (or is expected to exceed) a certain threshold. An alert may also be provided when an amount of increase in a toll rate exceeds a certain threshold. For example, a road that is typically tolled at about six cents per mile may be tolled at twelve cents per mile in especially poor weather and/or traffic congestion conditions. In such cases, users of the mobile device application may be alerted to the unusual spike in the toll rate. As a result of such alerts, users of the mobile device application may choose to avoid roads that are tolled at unusually high rates.

In some examples, the mobile device application may be further operable to provide navigational information, such as origin-to-destination routes and associated information (e.g., expected travel time, distance, etc.), maps, images, etc. The application may also provide specific tolling data corresponding to the navigational information. For example, maps and images may be overlaid with tolling rates, and expected toll charges for origin-to-destination routes may be displayed. In some example implementations, several alternative origin-to-destination routes may be provided to a user. For example, a first route may have a lower expected toll charge than a second route, but a longer expected travel time.

Figure 12D:
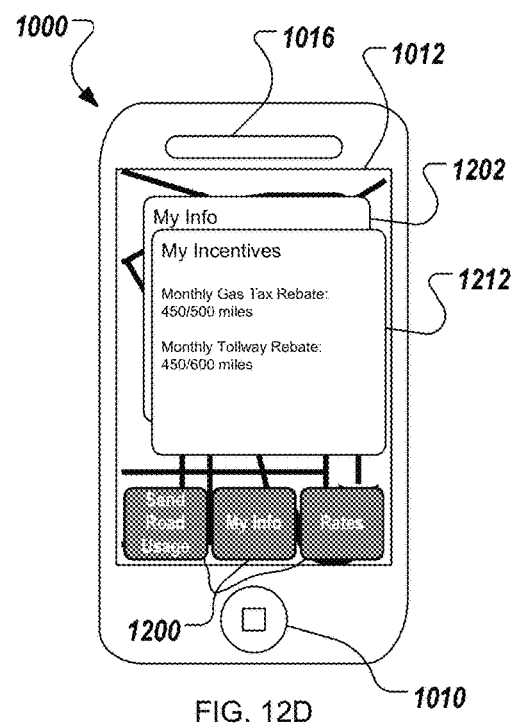

FIG. 12D shows mobile processing device 1000 displaying a sub-application page 1212 (i.e., the My Incentives application page). In this example, sub-application page 1212 provides incentive and/or advertisement data. In some example implementations, incentives and/or advertisements are determined by a tolling system based on road usage data collected and transmitted by the mobile device application, such that the incentives and/or advertisements are targeted at the participating entity. The incentives and/or advertisements may encourage continued use of the mobile device application by participating entities. For instance, in this example, incentives based on reported mileage are provided (e.g., rebates when predetermined reported mile totals are reached).

Although not shown or described in detail, other menu items 1200 (e.g., Send Road Usage) may be provided to initiate transmission of collected road usage data to a toll server, or to perform various other functions. Similarly, other sub-menu items 1204 (e.g., My Profile) also may be provided to curate or update user/entity profile information, or to perform various other functions.

Figure 13:
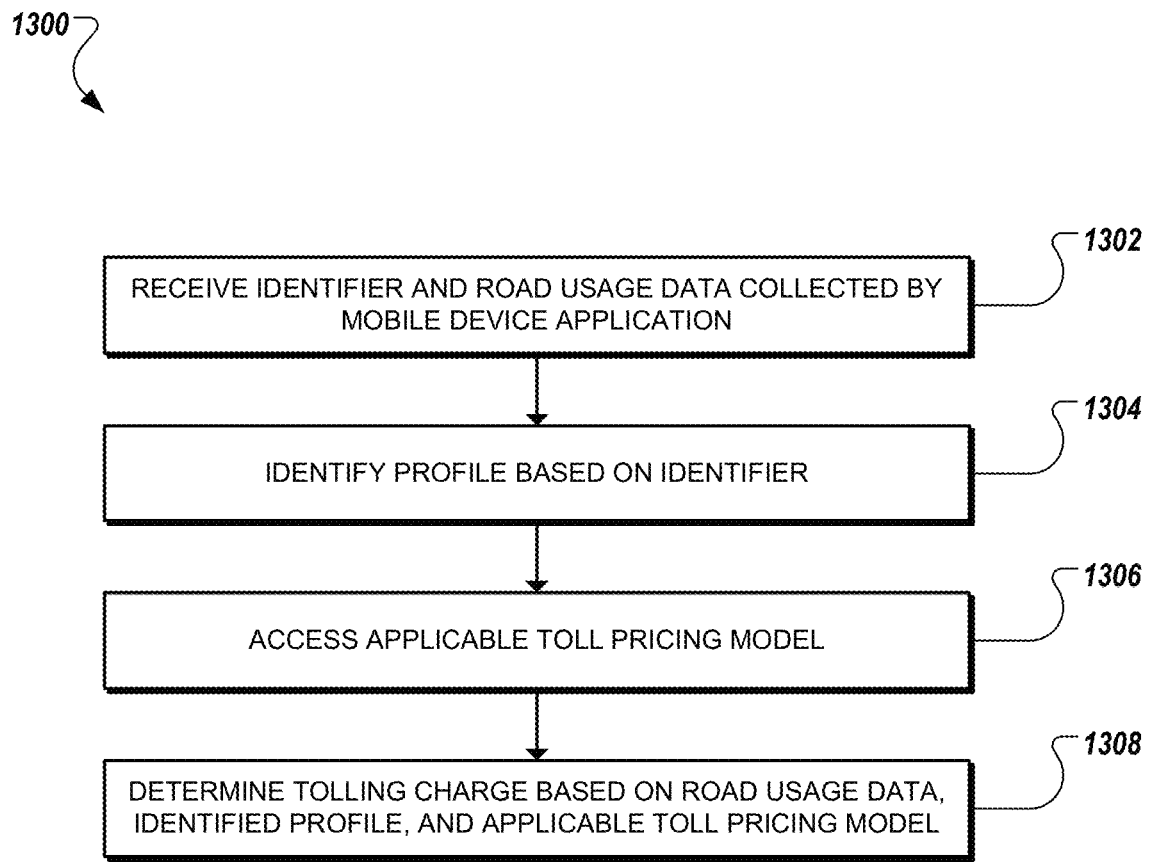

As described above, a mobile device application may be able to collect road usage data and transmit such data to a tolling system. In turn, the tolling system may determine a toll charge incurred based on the received road usage data. FIG. 13 is an exemplary tolling process 1300 that may be performed by a tolling system (e.g., tolling system 102). As shown, tolling process 1300 includes receiving road usage data collected by a mobile device application and an identifier, at operation 1302. The road usage data and identifier may be received directly from the mobile processing device running the mobile device application (e.g., mobile processing device 1000), or from a third party computing system (for example, an entity may upload the road usage data from the mobile processing device to a third party computing system and transmit the road usage data to the tolling system therefrom).

Based on the received identifier, the tolling system may identify a profile, at operation 1304. The profile may be a user created profile maintained by an entity associated with one or more vehicles, or a profile generated by a provider of the tolling system (or the tolling system itself) for tracking toll payments. The tolling system also may access an applicable toll pricing model, at operation 1306. Accessing the appropriate toll pricing model may be accomplished according to any suitable method. For example, accessing a toll pricing model may include constructing such a model based on the types of road usage data collected by the mobile device application. In another example, accessing a toll pricing model may include choosing an appropriate pricing model from a plurality of pre-constructed toll pricing models. According to an example implementation, the tolling system may determine an incurred tolling charge based on the received road usage data, the identified profile, and the toll pricing model, at operation 1308.

Figure 14A:
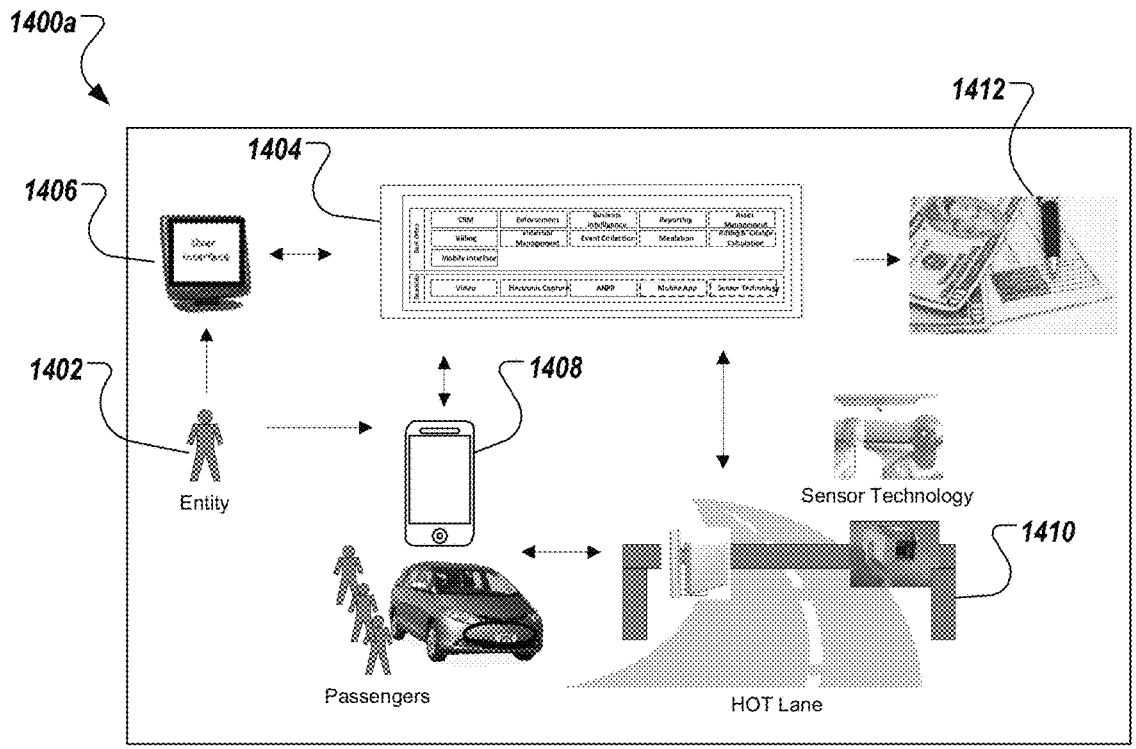
FIG. 14A is a diagram illustrating an exemplary High Occupancy Tolling (HOT) implementation.

FIG. 14*a* illustrates an exemplary High Occupancy Tolling (HOT) implementation 1400*a*. According to an example implementation, an entity 1402 may create a profile through one or more backend services of a provider 1404 using an entity interface of a computing device (e.g., a computer system or a mobile processing device) 1406. Entity 1402 may communicate with the provider through a mobile processing device 1408 running an appropriate mobile device application. Using mobile processing device 1408, entity 1402 may provide road usage data to a tolling system of provider 1404 (or alternatively, mobile processing device 1408 may collect and transmit road usage data automatically). For instance, in this example, entity 1402 may provide vehicle occupancy data or a capacitive sensor may be used to sense vehicle occupancy data. Roadside tolling equipment (e.g., gantries, data sources, etc.) 1410 may be used to supplement or verify the road usage data provided by entity 1402.

In some examples, the tolling system may determine whether entity 1402 has been activating the mobile device application during travel by detecting an event indicative of road usage by an entity, and determining whether the mobile device application was activated at the time of the detected event. For example, if a vehicle associated with the entity interacts with a vehicle occupancy sensor in a HOT lane, the tolling system may determine if corresponding vehicle occupancy data was also collected by the mobile device application. An absence of such data from the mobile device application may indicate the application was not activated. Based on this determination, an enforcement fine or incentive discount may be attributed to the entity.

Based on the road usage information, the tolling system may determine a toll charge incurred by entity 1402. For example, the tolling system may determine a variable toll charge based on the vehicle occupancy data. In this example, a higher charge may be applied when more occupants are present in a vehicle or a fine may be imposed if the HOT lane requires a threshold number of passengers and the vehicle occupancy data indicates a number of passengers less than the threshold. A transaction (1412) to settle the incurred toll charge may be initiated by provider 1404 through the tolling system or by entity 1402 through mobile processing device 1408 (or a suitable computer system).

Figure 14B:
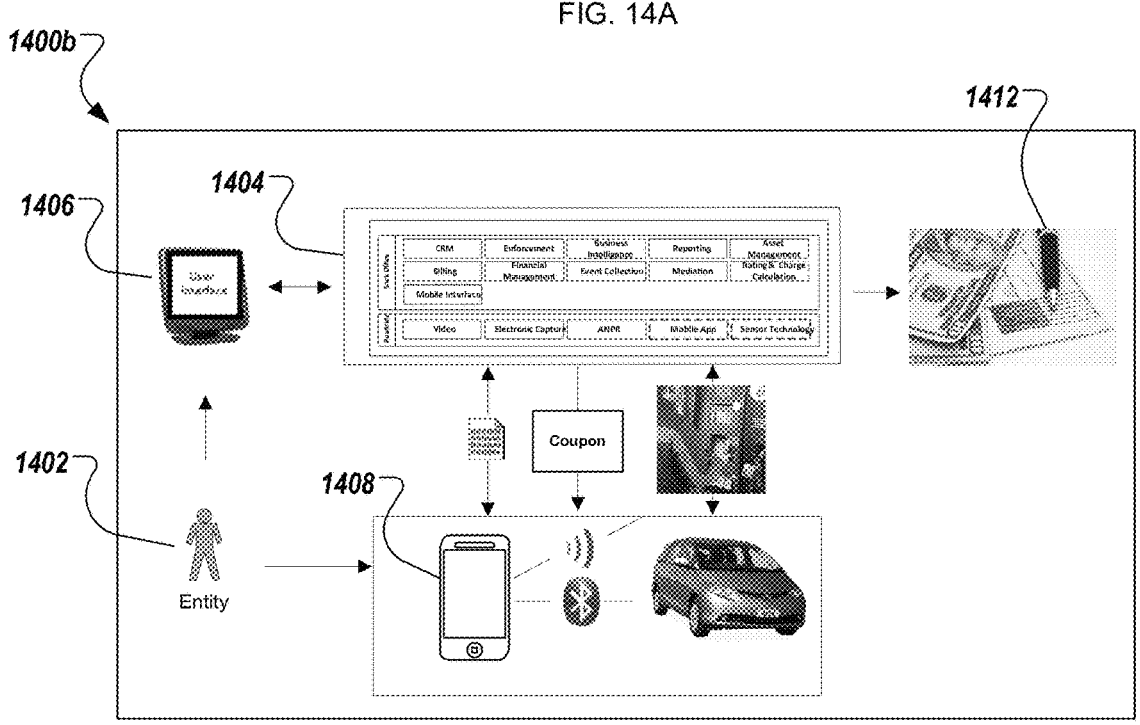
FIG. 14B is a diagram illustrating an exemplary Vehicle Miles Traveled (VMT) implementation.

FIG. 14B illustrates an exemplary Vehicle Miles Traveled (VMT) implementation 1400*b*. Again, entity 1402 may create a profile through one or more backend services of provider 1404 via computing device 1406. Through a mobile processing device 1408 running an appropriate mobile device application, entity 1402 may communicate collected road usage data to a tolling system of provider 1404. For instance, in this example, entity 1402 may provide vehicle miles traveled data as well as trip origin and destination data and fuel efficiency data. As described above, vehicle miles traveled data may be collected by accessing an on-board vehicular computing unit, or by accessing a GPS or third party mapping system. In some examples, the tolling system may determine whether entity 1402 has been activating the mobile device application during travel by comparing vehicle miles traveled data collected via the on-board vehicular computing unit with similar data collected via the GPS or third party mapping system. Based on this determination an enforcement fine or incentive discount may be attributed to an entity associated with the vehicle.

Based on the road usage information, the tolling system may determine a toll charge incurred by entity 1402. For instance, the tolling system may multiply a measured distance travelled by a computed toll rate to determine the toll charge. A transaction (1412) to settle the incurred toll charge may be initiated by provider 1404 through the tolling system or by entity 1402 through mobile processing device 1408 (or a suitable computer system).

Figure 15:
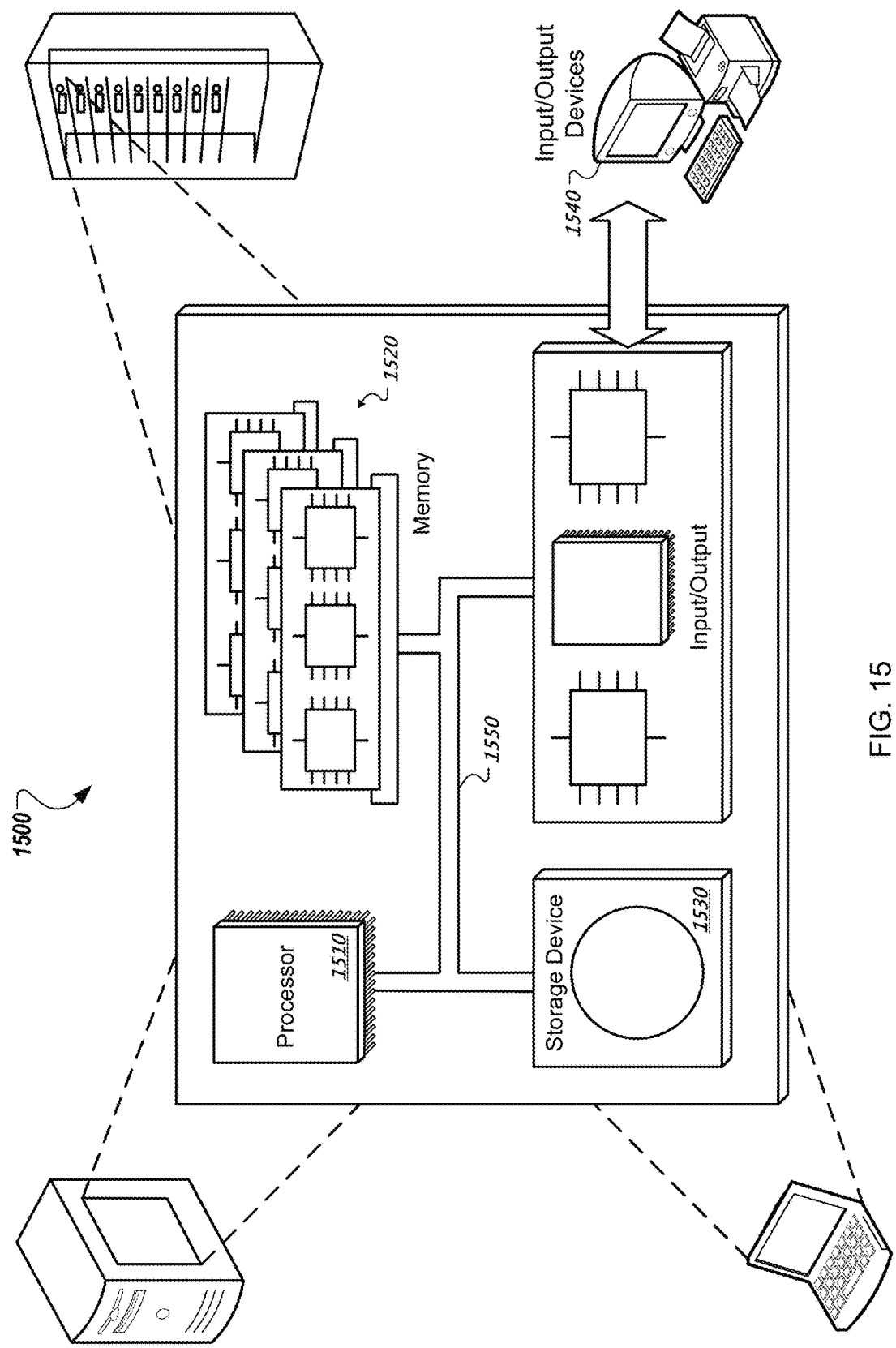
FIG. 15 is a diagram illustrating an exemplary computer system.

In some cases, provider 1404 also may determine one or more incentives (e.g., coupons) and/or advertisements based on the road usage and shared profile data. The incentives and/or advertisements may be linked to the profile of entity 1402 and transmitted directly to mobile processing device FIG. 15 illustrates an example of a generic computer system 1500. The system 1500 may be used for the operations described in association with processes 400, 1100, and 1300, according to an example implementation. For example, the system 1500 may be included in tolling system 102.

The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In an example implementation, the processor 1510 is a single-threaded processor. In another example implementation, the processor 1510 is a multi-threaded processor. The processor 1510 is capable of processing instructions stored in the memory 1520 or on the storage device 1530 to display graphical information for a user interface on the input/output device 1540.

The memory 1520 stores information within the system 1500. In an example implementation, the memory 1520 is a computer-readable medium. In another example implementation, the memory 1520 is a volatile memory unit. In yet another example implementation, the memory 1520 is a non-volatile memory unit.

The storage device 1530 is capable of providing mass storage for the system 1500. In an example implementation, the storage device 1530 is a computer-readable medium. In various different example implementations, the storage device 1530 may be a floppy disk device, a hard disk device, an optical disk device, or a tape device.

The input/output device 1540 provides input/output operations for the system 1500. In one example implementation, the input/output device 1540 includes a keyboard and/or pointing device. In another example implementation, the input/output device 1540 includes a display unit for displaying graphical user interfaces.

The features described may be implemented in digital electronic circuitry, or in computer hardware, firmware, software, or in combinations of them. Cloud computing resources may also be leveraged for implementing any features described herein. The apparatus may be implemented in a computer program product tangibly embodied in an information carrier, e.g., in a machine-readable storage device, for execution by a programmable processor; and method operations may be performed by a programmable processor executing a program of instructions to perform functions of the described example implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

A number of example implementations have been described. Nevertheless, it will be understood that various modifications may be made without departing from the spirit and scope of the disclosure. Accordingly, other implementations are within the scope of the following claims.

What is claimed is:

1. A tolling system comprising:
at least one processor; and
at least one memory coupled to the processor having stored thereon instructions which, when executed by the processor, causes the processor to perform operations comprising:
receiving, over a network and from a mobile device application operating on a mobile processing device portable by a user, an identifier and road usage data collected by the mobile device application using a location sensor of the mobile processing device, the mobile device application comprising a first source of road usage data;
receiving, over the network and also from the mobile device application operating on the mobile processing device portable by the user, road usage data collected by an on-board vehicle computing device included in a vehicle and received by the mobile device from the on-board vehicle computing device over a short-range wireless communication connection;
integrating road usage data received from the mobile device application with road usage data collected by the on-board vehicle computing device to define an integrated tolling data set of road usage data;
identifying a profile based on the identifier;
selecting, from among a plurality of preconstructed toll pricing models stored in computer memory, with each of the toll pricing models comprising a unique set of two or more toll pricing rules, and as a function of the identified profile and the integrated tolling data set, a toll pricing model having at least one toll pricing rule corresponding to road usage data collected by the mobile device application and at least one other toll pricing rule corresponding to whether the road usage data collected by the on-board vehicle computing device matches the road usage data collected by the mobile device application, wherein selecting the toll pricing model is based at least on:
  determining that road usage data received for an event indicative of toll road usage is collected by both the mobile device application and the on-board vehicle computing device; and
  in response to determining that road usage data received for the event indicative of toll road usage is collected by both the mobile device application and the on-board vehicle computing device, selecting the toll pricing model that includes the at least one toll pricing rule corresponding to whether the road usage data collected by the on-board vehicle computing device matches the road usage data collected by the mobile device application instead of selecting, from the plurality of preconstructed toll pricing models, another tolling price model that does not use road usage data collected by the mobile device application; and
determining a tolling charge incurred by an entity associated with the identified profile based on the integrated tolling data set, the identified profile, and the selected toll pricing model.

2. The tolling system of claim 1, wherein receiving road usage data collected by the mobile device application comprises receiving global positioning system data collected by the mobile device application using global positioning system hardware of the mobile processing device, the global positioning system data describing roads travelled and distance covered while the mobile device application was operating and collecting the global positioning system data.

3. The tolling system of claim 2:
  wherein selecting the toll pricing model comprises selecting a toll pricing model that sets a toll charge based on roads travelled and distance covered; and
  wherein determining the tolling charge incurred by the entity based on the integrated tolling data set, the identified profile, and the selected toll pricing model comprises determining a tolling charge incurred by the entity by applying the global positioning system data to the toll pricing model that sets a toll charge based on roads travelled and distance covered.

4. The tolling system of claim 1, wherein the operations further comprise:
  detecting, using a tolling data source external to the mobile device application, an event indicative of road usage engaged in by the entity;
  determining whether the mobile device application was operating at a time of the event indicative of road usage engaged in by the entity; and
  based on a determination that the mobile device application was not operating at a time of the event indicative of road usage engaged in by the entity, applying an enforcement fine to the entity.

5. The tolling system of claim 1, wherein the operations further comprise transmitting, over the network and to the mobile device application, the determined toll charge incurred by the entity, thereby allowing the determined toll charge to be viewed using the mobile processing device.

6. The tolling system of claim 1, wherein the operations further comprise:
  comparing toll charges incurred by the entity over a period of time to a usage alert threshold;
  based on the comparison, determining whether the toll charges incurred by the entity over the period of time meets the usage alert threshold; and
  based on a determination that the toll charges incurred by the entity over the period of time meets the usage alert threshold, transmitting, over the network and to the mobile device application, a usage alert that indicates toll charges incurred by the entity over the period of time that meets the usage alert threshold and that summarizes toll charges incurred by the entity over the period of time.

7. The tolling system of claim 1, wherein the operations further comprise:
  accessing data defining, for a particular time period, variables that impact tolling charges determined by the toll pricing model;
  determining an expected tolling rate that will be incurred by the entity for the particular time period based on the variables; and
  transmitting, over the network and to the mobile device application, the expected tolling rate that will be incurred by the entity for the particular time period, thereby allowing the expected tolling rate to be viewed using the mobile processing device prior to operating a vehicle during the particular time period.

8. The tolling system of claim 1, wherein the operations further comprise:
  determining an advertisement targeted to the entity based on the road usage data collected by the mobile device application and the identified profile; and
  transmitting, over the network and to the mobile device application, the advertisement targeted to the entity.

9. The tolling system of claim 1, wherein the operations further comprise:
  transmitting, over the network and to the mobile device application, the determined toll charge incurred by the entity; and
  engaging, over the network and with the mobile device application, in a payment transaction that allows payment of the determined toll charge incurred by the entity through the mobile device application.

10. The tolling system of claim 1, wherein determining a tolling charge incurred by an entity associated with the identified profile based on the integrated tolling data set, the identified profile, and the selected toll pricing model, comprises:
  determining whether the road usage data collected by the mobile device application matches the road usage data collected by the on-board vehicle computing device;
  in response to determining that the road usage data collected by the mobile device application does not match the road usage data collected by the on-board vehicle computing device, determining that the mobile device application was not operating on the mobile processing device; and
  in response to determining that the mobile device application was not operating on the mobile processing device, determining the tolling charge based on a fine associated with the mobile device application not operating on the mobile processing device in accordance with the toll policy.

11. The tolling system of claim 1, wherein determining a tolling charge incurred by an entity associated with the identified profile based on the integrated tolling data set, the identified profile, and the selected toll pricing model, comprises:

determining whether the road usage data collected by the mobile device application matches the road usage data collected by the on-board vehicle computing device;

in response to determining that the road usage data collected by the mobile device application matches the road usage data collected by the on-board vehicle computing device, determining that the mobile device application was operating on the mobile processing device; and in response to determining that the mobile device application was operating on the mobile processing device, determining the tolling charge based the mobile device application operating on the mobile processing device in accordance with the toll policy.

12. A computer-implemented method comprising:

receiving, over a network and from a mobile device application operating on a mobile processing device portable by a user, an identifier and road usage data collected by the mobile device application using a location sensor of the mobile processing device, the mobile device application comprising a first source of road usage data;

receiving, over the network and also from the mobile device application operating on the mobile processing device portable by the user, road usage data collected by an on-board vehicle computing device included in a vehicle and received by the mobile device from the on-board vehicle computing device over a short-range wireless communication connection;

integrating road usage data received from the mobile device application with road usage data collected by the on-board vehicle computing device to define an integrated tolling data set of road usage data;

identifying a profile based on the identifier;

selecting, from among a plurality of preconstructed toll pricing models stored in computer memory, with each of the toll pricing models comprising a unique set of two or more toll pricing rules, and as a function of the identified profile and the integrated tolling data set, a toll pricing model having at least one toll pricing rule corresponding to road usage data collected by the mobile device application and at least one other toll pricing rule corresponding to whether the road usage data collected by the on-board vehicle computing device matches the road usage data collected by the mobile device application, wherein selecting the toll pricing model is based at least on:

determining that road usage data received for an event indicative of toll road usage is collected by both the mobile device application and the on-board vehicle computing device; and in response to determining that road usage data received for the event indicative of toll road usage is collected by both the mobile device application and the on-board vehicle computing device, selecting the toll pricing model that includes the at least one toll pricing rule corresponding to whether the road usage data collected by the on-board vehicle computing device matches the road usage data collected by the mobile device application instead of selecting, from the plurality of preconstructed toll pricing models, another tolling price model that does not use road usage data collected by the mobile device application; and determining a tolling charge incurred by an entity associated with the identified profile based on the integrated tolling data set, the identified profile, and the selected toll pricing model.

13. The method of claim 12, wherein receiving road usage data collected by the mobile device application comprises receiving global positioning system data collected by the mobile device application using global positioning system hardware of the mobile processing device, the global positioning system data describing roads travelled and distance covered while the mobile device application was operating and collecting the global positioning system data.

14. The method of claim 13:

wherein selecting the toll pricing model comprises selecting a toll pricing model that sets a toll charge based on roads travelled and distance covered; and wherein determining the tolling charge incurred by the entity based on the integrated tolling data set, the identified profile, and the selected toll pricing model comprises determining a tolling charge incurred by the entity by applying the global positioning system data to the toll pricing model that sets a toll charge based on roads travelled and distance covered.

15. The method of claim 12, wherein the operations further comprise:

detecting, using a tolling data source external to the mobile device application, an event indicative of road usage engaged in by the entity;

determining whether the mobile device application was operating at a time of the event indicative of road usage engaged in by the entity; and based on a determination that the mobile device application was not operating at a time of the event indicative of road usage engaged in by the entity, applying an enforcement fine to the entity.

16. The method of claim 12, wherein the operations further comprise transmitting, over the network and to the mobile device application, the determined toll charge incurred by the entity, thereby allowing the determined toll charge to be viewed using the mobile processing device.

17. The method of claim 12, wherein the operations further comprise:

comparing toll charges incurred by the entity over a period of time to a usage alert threshold;

based on the comparison, determining whether the toll charges incurred by the entity over the period of time meets the usage alert threshold; and based on a determination that the toll charges incurred by the entity over the period of time meets the usage alert threshold, transmitting, over the network and to the mobile device application, a usage alert that indicates toll charges incurred by the entity over the period of time that meets the usage alert threshold and that summarizes toll charges incurred by the entity over the period of time.

18. A non-transitory computer-readable medium storing software comprising instructions executable by one or more computers which, upon such execution, cause the one or more computers to perform operations comprising:

receiving, over a network and from a mobile device application operating on a mobile processing device portable by a user, an identifier and road usage data collected by the mobile device application using a location sensor of the mobile processing device, the mobile device application comprising a first source of road usage data;

receiving, over the network and also from the mobile device application operating on the mobile processing device portable by the user, road usage data collected by an on-board vehicle computing device included in a vehicle and received by the mobile device from the on-board vehicle computing device over a short-range wireless communication connection;

integrating road usage data received from the mobile device application with road usage data collected by the on-board vehicle computing device to define an integrated tolling data set of road usage data;

identifying a profile based on the identifier;

selecting, from among a plurality of preconstructed toll pricing models stored in computer memory, with each of the toll pricing models comprising a unique set of two or more toll pricing rules, and as a function of the identified profile and the integrated tolling data set, a toll pricing model having at least one toll pricing rule corresponding to road usage data collected by the mobile device application and at least one other toll pricing rule corresponding to whether the road usage data collected by the on-board vehicle computing device matches the road usage data collected by the mobile device application, wherein selecting the toll pricing model is based at least on:

determining that road usage data received for an event indicative of toll road usage is collected by both the mobile device application and the on-board vehicle computing device; and in response to determining that road usage data received for the event indicative of toll road usage is collected by both the mobile device application and the on-board vehicle computing device, selecting the toll pricing model that includes the at least one toll pricing rule corresponding to whether the road usage data collected by the on-board vehicle computing device matches the road usage data collected by the mobile device application instead of selecting, from the plurality of preconstructed toll pricing models, another tolling price model that does not use road usage data collected by the mobile device application; and determining a tolling charge incurred by an entity associated with the identified profile based on the integrated tolling data set, the identified profile, and the selected toll pricing model.

* * * * *

UNITED STATES PATENT AND TRADEMARK OFFICE
CERTIFICATE OF CORRECTION

PATENT NO. : 9,665,991 B2  Page 1 of 1
APPLICATION NO. : 13/174250
DATED : May 30, 2017
INVENTOR(S) : Michael E. Simanek, Michael J. Wilson and Martin W. Glowik It is certified that error appears in the above-identified patent and that said Letters Patent is hereby corrected as shown below:

In the Claims

In Claim 11, Column 21, Line 13 (approx.), delete "based the" and insert -- based on the --, therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*